(12) United States Patent
Nadler et al.

(10) Patent No.: US 10,169,707 B1
(45) Date of Patent: Jan. 1, 2019

(54) SYSTEM AND METHOD FOR GENERATING PREDICTIONS OF GEOPOLITICAL EVENTS

(71) Applicant: Predata, Inc., New York, NY (US)

(72) Inventors: Daniel Joseph Nadler, Cambridge, MA (US); Andrew Yujin Choi, New York, NY (US)

(73) Assignee: Predata, Inc., New York, NY (US)

( * ) Notice: Subject to any disclaimer, the term of this patent is extended or adjusted under 35 U.S.C. 154(b) by 694 days.

(21) Appl. No.: 14/545,828

(22) Filed: Jun. 2, 2015

(51) Int. Cl.
*G06F 15/18* (2006.01)
*G06N 5/04* (2006.01)
*G06F 17/30* (2006.01)
*G06Q 50/26* (2012.01)
*G06N 99/00* (2010.01)

(52) U.S. Cl.
CPC ......... *G06N 5/04* (2013.01); *G06F 17/30412* (2013.01); *G06N 99/005* (2013.01); *G06Q 50/26* (2013.01)

(58) Field of Classification Search
CPC ... G06N 5/04; G06N 99/005; G06F 17/30412
USPC ................................................ 706/11, 15, 45
See application file for complete search history.

(56) References Cited

U.S. PATENT DOCUMENTS

| 7,433,876 B2* | 10/2008 | Spivack ............... G06F 17/3089 |
| 8,115,592 B2* | 2/2012 | Spence ................... H04M 11/04 340/1.1 |
| 9,792,285 B2* | 10/2017 | Reiley ............... G06F 17/30035 |
| 2005/0114281 A1* | 5/2005 | Riggs ..................... G06Q 10/00 706/46 |
| 2011/0078157 A1* | 3/2011 | Sun ........................ G06Q 30/02 707/749 |
| 2013/0091147 A1* | 4/2013 | Kim ....................... G06Q 30/00 707/748 |
| 2015/0012410 A1 | 1/2015 | Eastwood et al. |
| 2015/0143443 A1* | 5/2015 | Boyle ................ H04N 21/4788 725/110 |
| 2016/0196610 A1 | 7/2016 | Eastwood et al. |

FOREIGN PATENT DOCUMENTS

WO    2016112213    7/2016

\* cited by examiner

*Primary Examiner* — David R Vincent
(74) *Attorney, Agent, or Firm* — Lowenstein Sandler LLP

(57) ABSTRACT

A system and method for generating predictions of geopolitical events is provided. Predictions may be generated by retrieving relevant metadata associated with a content item and assessing a plurality of signals representative of the same. The plurality of signals may be comprised of a contestation signal based on a first parameter extracted from the retrieved metadata, an activity signal based on a second parameter extracted from the retrieved metadata, and a composite signal that is a function of the contestation signal and the activity signal.

19 Claims, 21 Drawing Sheets

Edit Page Record

502A — Home / Data / Sources / Pages / Edit Page Record

Information

504A:
- Source Category: opposition
- Countries: x Egypt
- Topics:
- English Name: Mohamed Morsi
- Original Name: Mohamed Morsi
- Language: English
- URL: http://en.wikipedia.org/wiki/Mohamed_Morsi 506A:
- Save Page Record
- Delete Page Record
- ← Back to Page Records

FIG. 5A

USER INTERFACE 500A

SYSTEM AND METHOD FOR GENERATING PREDICTIONS OF GEOPOLITICAL EVENTS

TECHNICAL FIELD

This disclosure relates to the field of intelligence analysis and, more particularly, to generating predictions of geopolitical conflicts and events based on aggregated data.

BACKGROUND

The ability to monitor, track, and predict geopolitical events, including civil unrest, mass uprisings, revolutions, coups, the outbreak of war or military conflict, a change in political regimes, impending terrorism, assassination attempts, hijackings, kidnappings, labor disruptions, organized violence, and other forms of geopolitical instability, is useful to make informed decisions when acting in the international arena and protecting the domestic homeland, as well as in managing risk and identifying economic opportunities.

While monitoring, tracking, and predicting geopolitical events is desirable, doing so in an early-warning manner to provide anticipatory and actionable intelligence is a challenge due to the volume of relevant data to be analyzed and the often secret or obfuscated nature of primary sources of data. Moreover, extracting geopolitical knowledge from secondary data sources, such as those representing the wisdom of crowds as measured by their collective online behavior, poses a significant data management, as well as challenging computational, problem when attempting to model such online behavior.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 5A illustrates a user interface for generating a record to track an online encyclopedia article in accordance with an embodiment of the disclosure;

DETAILED DESCRIPTION

Figure 1A:
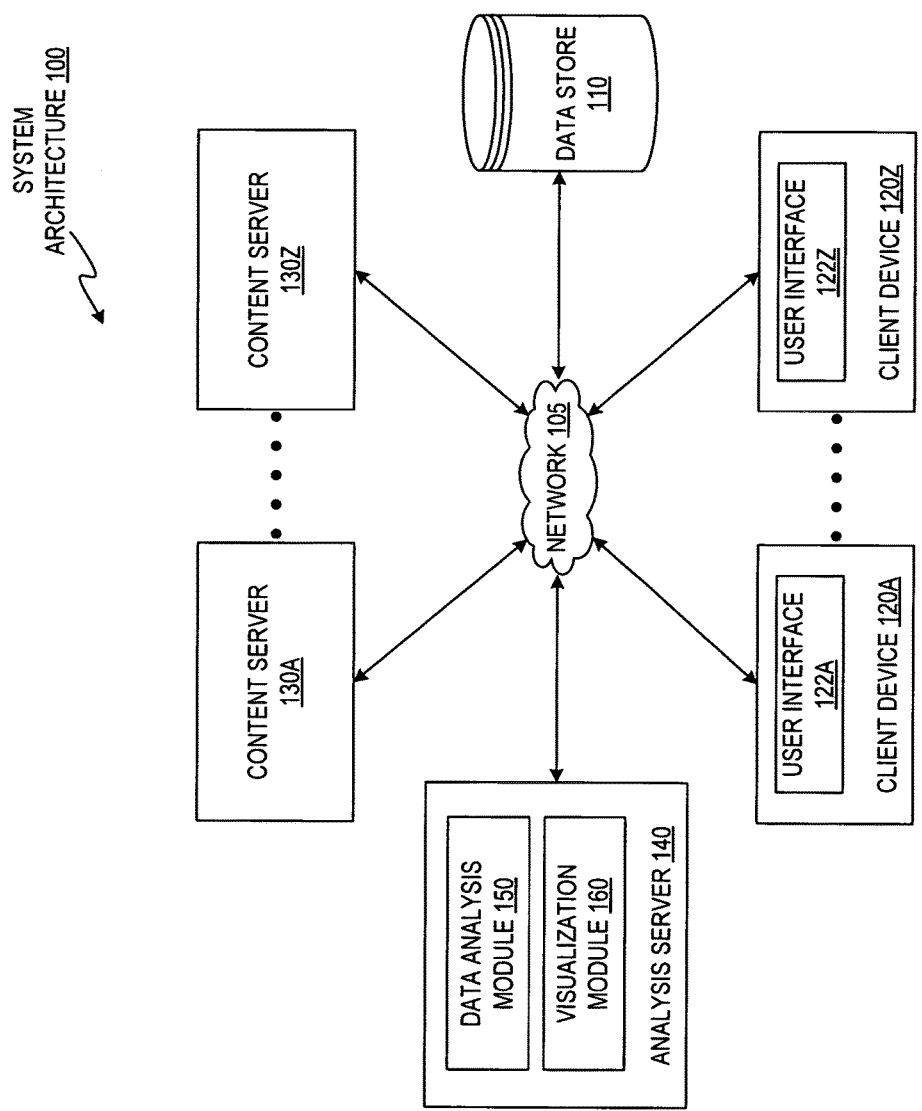
FIG. 1A illustrates an example system architecture in accordance with an embodiment of the disclosure.

Described herein are embodiments for the modeling and prediction of geopolitical events from data obtained from public data sources (referred to herein as "open-source data"), such as online collaborative encyclopedias, online videos, online newspapers, as well as embodiments for visualization of the underlying predictive signals. The embodiments described herein extract various parameters from meta data associated with open source, collaborative content to identify meaningful statistical anomalies, which may be predictive of geopolitical conflict, and present signals derived from such data in a comprehensible and timely manner. Open source signals intelligence techniques, methods, algorithms, and end-user systems, leveraged toward predicting geopolitical instability and civil unrest are disclosed. Specifically, a system and method for open-source signals intelligence and 'chatter' analytics via the measurement and analysis of crowd behavior on various content platforms are disclosed. Crowd behavior and interactions with respect to geopolitical subject matter may be received from one or more feeds (including online collaborative encyclopedia, newspapers, blogs, and other forms of scrapable online media containing discoverable metadata), and may be processed and analyzed to predict geopolitical developments and provide actionable anticipatory intelligence based on current and historical data.

Open source content is often editable or may be accompanied by editable content or consumer-generated messages. For example, a Wikipedia page contains content that may be generated and edited by various consumers of the content. As another example, content items, such as online videos and online newspaper articles, may have comments sections that allow consumers to generate text-based messages pertaining to the substance of the content item or in direct response to other consumers' messages. While such public data is readily accessible, there has been no known scholarly evidence that the tone, sentiment, or language of a newspaper article, encyclopedia article, video, blog post, or social media page can reliably predict geopolitical conflict. Moreover, since changes to sentiment, even if meaningfully detectable, rarely have even the temporal resolution necessary to predict geopolitical conflict, it is exceedingly difficult to process such data in a time-sensitive manner.

Metadata associated with open source content items may track details pertaining to the consumer behavior, such as a number of edits, overall traffic, a number of comments posted, etc. In an online encyclopedia, for example, every page view, edit, reverted edit, and discussion post, as well as scores of other user-activity attributes, are saved as article metadata and are publically available. For online videos, video views, comments, and scores of other user-activity attributes, are saved as metadata and publically available. Many online newspapers also save and make available this user data, which can be retrieved based on knowledge of the application programming interface (API) of the comments section of the online newspaper. However, it is impractical for a human reader to manually browse the comment and edit pages of a Wikipedia article, online videos, or online newspaper to visually identify conflict by manually reading the metadata of each article or video, much less comparing such metadata across different sources over the same time duration.

The embodiments described herein provide a method of controversy detection based on the metadata of open source content items, and based specifically on statistical relationships extracted from the metadata of the content items, such as edits to the article and a number of unique users contributing to an online discussion of a controversial topic. The temporal dimensions of such statistical relationships may be used to identify patterns within the metadata, such as patterns in the edits of the article over time or in the arguments associated with the video, without requiring processing of the language, semantic content, substance, or sentiment of the discussion surrounding the content item. Furthermore, focusing on the metadata of these article-based or video-based "discussions" and "arguments", rather than on their semantic content, results in a system that is language independent and which can be used across many different national and language environments. Mathematical transformations of various signals generated from the metadata may then be used to provide actionable anticipatory intelligence. The automated and ongoing nature of the disclosed embodiments may detect controversy that can be leveraged toward producing a real-time geopolitical early warning system (as opposed to, for example, a one-time analysis characteristic of academic research, which is necessarily retrospective).

Each content item has a range of metadata associated with it, such as the absolute or relative number or volume of views, comments, edits, reverted edits, and arguments. Accordingly, an infinite number of combinations of weights may be applied to the range of article or video metadata in order to construct a composite signal that has the highest correlation with the underlying degree of controversy of the content item. It is, therefore, difficult to select an appropriate metadata attribute to serve as the most appropriate signal of political volatility, as well as have the highest correlation with actual instances of political volatility in, or pertaining to, the nations, entities, or actors that form the subject matter of the content item. The weights to apply to the signals may be optimally achieved via a range of potential mathematical relations between the time-dependent signals, including, but not limited to, summation, averaging, exponentiation (e.g., one signal is construed as the exponent to be applied to another), or by computing an exponentially weighted moving average utilizing different exponential decay factors and durations through which the moving average is calculated. The most optimal relationships may vary depending on the type of metadata as well as the region, nation, subject matter, or geopolitical entity being tracked. As described herein, certain embodiments are utilized to perform ongoing, dynamic, regression testing of the various combinations of weights that may be applied to the signals generated from the metadata, as well as quantification of a rate of prediction across a sample of geopolitical events to be predicted in the training set. For example, an optimization procedure may take a set of events of political volatility as a training set, with most highly correlated mixture and combination of signal weights being identified as the most predictive signal for political volatility. Training and prediction optimization sets of political volatility can be constructed along regional, national, actor, entity, or subject matter dimensions.

Wikipedia is a particularly well suited content platform for data-mining of Internet-based collaborative processes toward the prediction of geopolitical conflict. This is especially the case given that the authorship and maintenance of geopolitical subject-matter articles on Wikipedia is often not peaceful and collaborative, and is frequently associated with intensive fights (so-called "edit wars") between opposing groups, which in many cases correspond to the opposing factions or parties who are participants in the real-world conflicts described in the article subject matter. Many online videos and online newspaper articles also reveal extensive comments and arguments between one or more commentators, often in long stretches of point and counter-point argumentation.

Wikipedia edit wars, which involve bursts of edits and reverts of edits to a specific Wikipedia page at specific moments in time, may be statistically tested for their temporal correspondence to offline behaviors, such as actual physical violence, political conflict, and instability in the regions described and contested in the associated Wikipedia articles. Additionally, YouTube metadata and online newspaper metadata may be statistically tested for their temporal correspondence to offline behaviors, such as actual physical violence, political conflict, and instability in the regions and topics that are the content's subject matter.

FIG. 1A illustrates an example system architecture 100, in accordance with an embodiment of the disclosure, for geopolitical event prediction and event prediction data visualization. The system architecture 100 includes a data store 110, client devices 120A-120Z, content servers 130A-130Z, and an analysis server 140, with each device of the system architecture 100 being communicatively coupled via a network 105. One or more of the devices of the system architecture 100 may be implemented using computer system 800, described below with respect to FIG. 8.

In one embodiment, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Although the network 105 is depicted as a single network, the network 105 may include one or more networks operating as a stand-alone networks or in cooperation with each other. The network 105 may utilize one or more protocols of one or more devices to which they are communicatively coupled. The network 105 may translate to or from other protocols to one or more protocols of network devices.

In one embodiment, the data store 110 may be a memory (e.g., random access memory), a cache, a drive (e.g., a hard drive), a flash drive, a database system, or another type of component or device capable of storing data. The data store 110 may also include multiple storage components (e.g., multiple drives or multiple databases) that may also span multiple computing devices (e.g., multiple server computers). In some embodiments, the data store 110 may be cloud-based. One or more of the devices of system architecture 100 may utilize their own storage and/or the data store 110 to store public and private data, and the data store 110 may configured to provide secure storage for private data. In some embodiments, the data store 110 for data back-up or archival purposes.

The client devices 120A-120Z may each include computing devices such as personal computers (PCs), laptops, mobile phones, smart phones, tablet computers, netbook computers, etc. Client devices 120A-120Z may also be referred to as "user devices" or "mobile devices". An individual user may be associated with (e.g., own and/or use) one or more of the client devices 120A-120Z. The client devices 120A-120Z may each be owned and utilized by different users at different locations. As used herein, a "user" may be represented as a single individual. However, other embodiments of the disclosure encompass a "user" being an entity controlled by a set of users and/or an automated source. For example, a set of individual users federated as a community in a company or government organization may be considered a "user".

The client devices 120A-120Z may each implement user interfaces 112A-112Z, respectively. Each of the user interfaces 112A-112Z may allow a user of the respective client device 120A-120Z to send/receive information to/from each other, the data store 110, one or more of the content servers 130A-130Z, and the analysis server 140. For example, one or more of the user interfaces 112A-112Z may be a web browser interface that can access, retrieve, present, and/or navigate content (e.g., web pages such as Hyper Text Markup Language (HTML) pages) provided by the analysis server 140. As another example, one or more of the user interfaces 112A-112Z may enable data visualization with their respective client device 120A-120Z. In one embodiment, one or more of the user interfaces 112A-112Z may be a standalone application (e.g., a mobile "app", etc.), that allows a user of a respective client device 120A-120Z to send/receive information to/from each other, the data store 110, one or more of the content servers 130A-130Z, and the analysis server 130. FIGS. 3A-3I provide examples of user interfaces for tracking and monitoring political volatility, and are discussed in greater detail below.

In one embodiment, the content servers 130A-130Z may each be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components from which content items and metadata may be retrieved/aggregated. In some embodiments, one or more of the content servers 130A-130Z may be a server utilized by any of the client devices 120A-120Z or the analysis server 140 to retrieve/access content or information pertaining to content (e.g., content metadata).

In some embodiments, the content servers 130A-130Z may serve as sources of content that can be provided to any of the devices of the system architecture 100. The content servers 130A-130Z may host various types of content, including, but not limited to, editable online encyclopedia articles, online news articles, online forums, and video content. In some embodiments, the content servers 130A-130Z may specialize in particular types of content (e.g., a first content server that hosts video content, another content server that hosts online articles, etc.). In some embodiments, one or more of the content servers 130A-130Z may host shared content, private content (e.g., content restricted to use by a single user or a group of users), commercially distributable content, etc. In some embodiments, one or more of the content servers 130A-130Z may maintain content databases, which can include records of content titles, descriptions, keywords, cross-references to related content or associated content, metadata describing edits or updates to the content, and user account data (e.g., user IDs for editing content and/or posting comments).

In one embodiment, the analysis server 140 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to retrieve content metadata for generating predictions of geopolitical events. The analysis server 140 includes a data analysis module 150 for modeling the retrieved data and generating predictive signals, and a visualization module 160 for data visualization or for supporting data visualization by one of the client devices 120A-120Z.

In some embodiments, the analysis server 140 may utilize the data analysis module 150 to process data across multiple systems to enhance performance, utilizing, for example, high speed data availability clusters and/or a cloud based infrastructure to enable complex computation in near real time. In such embodiments, the data analysis module 150 may be distributed across various devices and/or implemented as a software as a service (SaaS) platform. The data analysis module 150 may perform data preparation operations including, but not limited to, scrubbing of data, cleaning of data, and standardization of data. The data analysis module 150 may be configured to perform high speed searching of large scale geopolitical subject matter data, large scale geopolitical subject matter data management, real-time geopolitical conflict probability analysis, predictive analytics, and geopolitical conflict probability visualization (e.g., in conjunction with the visualization module 160). In some embodiments, the data analysis module 150 allows for construction and modeling of synthetic geopolitical events (e.g., a compound set of events that occur clustered together, or in close sequence of each other), which may be used as a test signal for calibrating/optimizing the generation of predictive signals. In some embodiments, the data analysis module 150 may utilize machine learning algorithms. For example, historical data may be analyzed to predict precisely how long after a spike in edit warring or crowd chatter associated with an on-line article or video that a geopolitical event typically occurs. In some embodiments, the machine learning algorithm may be used to modify composite signals generated from processing of retrieved metadata (e.g., scaling, weighting, time-shifting, etc.).

Figure 1B:
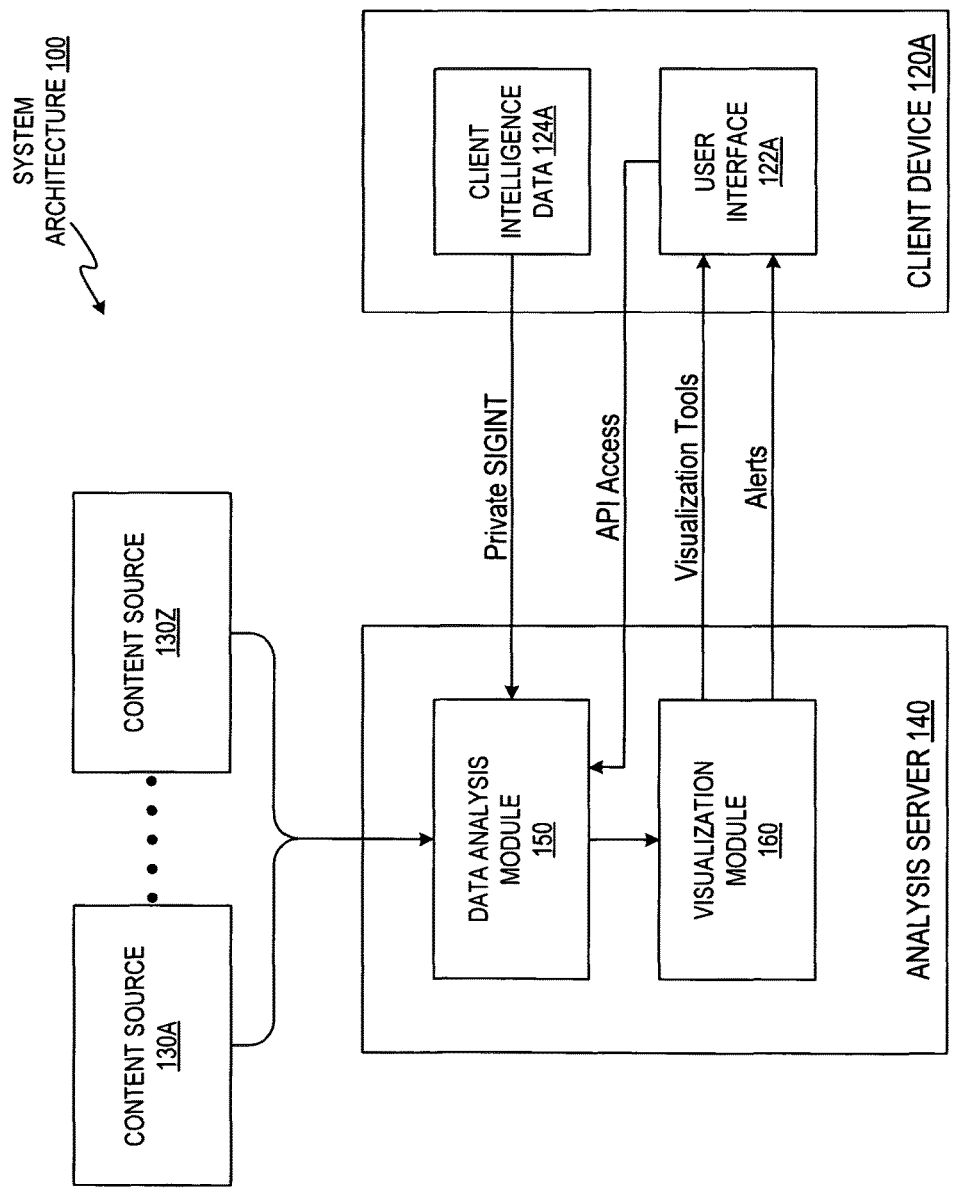
FIG. 1B illustrates data flow in a system architecture in accordance with an embodiment of the disclosure.

FIG. 1B is a block diagram illustrating data flow within the system architecture 100 in accordance with an embodiment of the disclosure. The data analysis module 150 may provide API access to a client device 120A, for example, which allows a user operating the client device 120A to transmit instructions (e.g., using the user interface 122A) indicating which content items to track and monitor. The data analysis module 150 may also utilize client intelligence data 124A, which may include private signal intelligence (SIGINT) data usable in identifying appropriate content items for tracking and monitoring. The data analysis module 150 may then aggregate metadata from the content servers 130A-130Z to perform signal analysis. The visualization module 160 may serve as a platform for providing visualization options to the client device 120A, allowing for visualization of signals generated by the data analysis module 150 via the user interface 122A.

In one embodiment, the data analysis module 150 may contain, include, or combine country-, institution-, and actor-specific real-time political volatility signals, toward the purpose of predicting geopolitical and civil unrest, by analyzing views, comments, edits, reverted edits, and arguments of editable online articles, online videos, online newspapers, and other collaborative content items. The data analysis module 150 may dynamically and programmatically measure and/or rank contested edits (e.g., "warring edits" that serve as a proxy for a degree of controversy surrounding a content item) and digital arguments (e.g., extended comment sections of online videos and online newspapers) via the application of a "web crawler" algorithm (also known as a "web scraper") to various content sources. The signals generated therefrom may be blended to derive a set of composite signals calibrated for their accuracy at measuring how "contested" a content item is and how likely a set of crowd behaviors surrounding a given content item is to serve as a predictor of offline behaviors, such as mass uprisings, civil unrest, revolutions, assassinations, the outbreak of war or military conflict, a change in political regimes, impending terrorism, hijackings, kidnappings, labor disruptions, organized violence, and other forms of political instability.

In one embodiment, the data analysis module 150 may define a controversy measure for each online encyclopedia or online newspaper article or video, or a normalized-scale controversy measure for all online encyclopedia or online newspaper articles or videos, or a normalized-scale controversy measure for all articles or videos in a specific subject category, or pertaining to a specific geographical region or political demarcation. The controversy measure may quantify the absolute or relative size and intensity of an edit war or digital argument taking place over a specific content item over a specific time duration.

As user activity related to an article or video spike at the same time as an edit war or at the same time as an article or video becomes controversial, such a signal may also have a lead relationship to offline geopolitical developments in, or pertaining to, the nations, entities, or actors that form the subject matter of that article or video. The data analysis module 150 may generate a composite signal combining the measure of controversy (referred to herein as a "contestation signal") at a given time with a measure of activity, such as the absolute or relative number or volume of article or video views, article edits, reverted edits, article users, and article talk page comments (referred to herein as an "activity signal"), at the given time.

In one embodiment, the data analysis module 150 may test and relate a set of geopolitical events to be predicted to a measure of the number of words deleted by or between editors or a set of specifically identified editors. Additionally, the data analysis module 150 may examine the relationship between the structural aspects of conversations in user-driven content generation areas ("comment sections" of on-line articles and videos) and the set of political volatility events to be predicted by generating descriptive statistics regarding the number of replies to certain areas of interest. In one embodiment, the data analysis module 150 may determine distinctions between reverts among editors over the substance of an article and reverts made to articles as way of countering vandalism, and may filter or clean retrieved metadata accordingly.

In one embodiment, the data analysis module 150 may download an entire dataset covering every on-line article or video from an online encyclopedia, an online video source, an online newspaper, or a blog, and may do so at a regularly scheduled time, or at the request of a user, or when the system identifies that new articles have been created. In another embodiment, the data analysis module 150 may utilize a record or query system, where a user can create a record of a content item to be tracked. The data analysis module 150 may then download only the metadata requested by the user. FIGS. 5A-5E illustrate exemplary user interfaces by which a user can create a content item record.

In one embodiment, the data analysis module 150 may detect article reverts by identifying and calculating variations in the article's URL structure or the URL structure of the article talk page or edit history. In one embodiment, the data analysis module 150 may detect article reverts by identifying and calculating a cryptographic hash function to produce a 128-bit hash value (typically expressed in text format as a 32 digit hexadecimal number) such as the MD5 message-digest algorithm, and compare the hash functions of different article revisions.

In one embodiment, the data analysis module 150 may detect article reverts by identifying and calculating variations in the article's size, as measured in kilobytes, and by comparing the sizes of different article revisions or different stages in the article's history. Additionally, the data analysis module 150 may detect increased levels of contestation by examining the sizes of user-generated content (e.g., comments) as measured in kilobytes, and generating descriptive statistics based on these underlying data. In one embodiment, the data analysis module 150 may detect article reverts by identifying and calculating the timestamp of edits to the article.

In one embodiment, the data analysis module 150 may detect article reverts by identifying and calculating the unique revision ID of edits to the article. Additionally, the data analysis module 150 may detect increased levels of contestation in user-driven content generation areas (e.g., comment sections) by examining unique user IDs that are provided by the underlying system or by examining the identifier (also known as a "screen name" or "handle") that the user has chosen. In one embodiment, the data analysis module 150 may detect article reverts by identifying and calculating edit activity attached to a specific pair of identifiable users, and such a process may therefore identify and exclude self-reverts made by a specific user. Additionally, in one embodiment, the data analysis module 150 may examine the metadata collected from these content areas and determine which pieces of content are not semantically related to the underlying media and can be considered to be extraneous, and exclude metadata gathered from extraneous pieces of content. In one embodiment, the procedure described above may dynamically and programmatically distinguish a hierarchy of identifiable editors within a specific article, ranked by the total number of edits each user has made to that specific article.

In one embodiment, the data analysis module 150 may distinguish reverts made by an experienced editor to edits by an inexperienced editor (likely due to an instance of vandalism cleanup) from reverts made by an inexperienced editor to edits by an experienced editor (perhaps more likely a genuine case of edit warring over substance), where in both cases "experienced" or "inexperienced" editors are defined with respect to the article page.

In one embodiment, the data analysis module 150 may detect article reverts through a combination of the embodiments described above, and the resulting signals generated by extracting various parameters from the metadata may be blended to form a composite contestation signal for each article. Signals may be iteratively refined and calibrated to new training sets, via ongoing regression testing and a quantification of the rate of prediction across the sample of geopolitical events to be predicted in the training set.

In one embodiment, combinations of the embodiments described above may be constructed for temporally different observation windows, such as hours, days, weeks, and years, where each different unit of time acts results in a different early geopolitical warning system based on different temporal units of analysis. For example, using a month as its unit of analysis may not result in a signal associated with a prediction of geopolitical conflict for a given nation, entity, or actor, while at the same time the system that takes a day as its unit of analysis may result in such a signal. In one embodiment, signals may be optimized for temporally different observation windows, such as hours, days, weeks, and years.

Although each of the data store 110, the analysis server 140, and the data store 110 are depicted in FIG. 1A as single, disparate components, these components may be implemented together in a single device or networked in various combinations of multiple different devices that operate together. In some embodiments, some or all of the functionality of the analysis server 140 may be performed by one or more of the client computer devices 120A-120Z. For example, the client device 120A may implement a software application that performs the functions of the data analysis module 150 and/or the visualization module 160.

Figure 2:
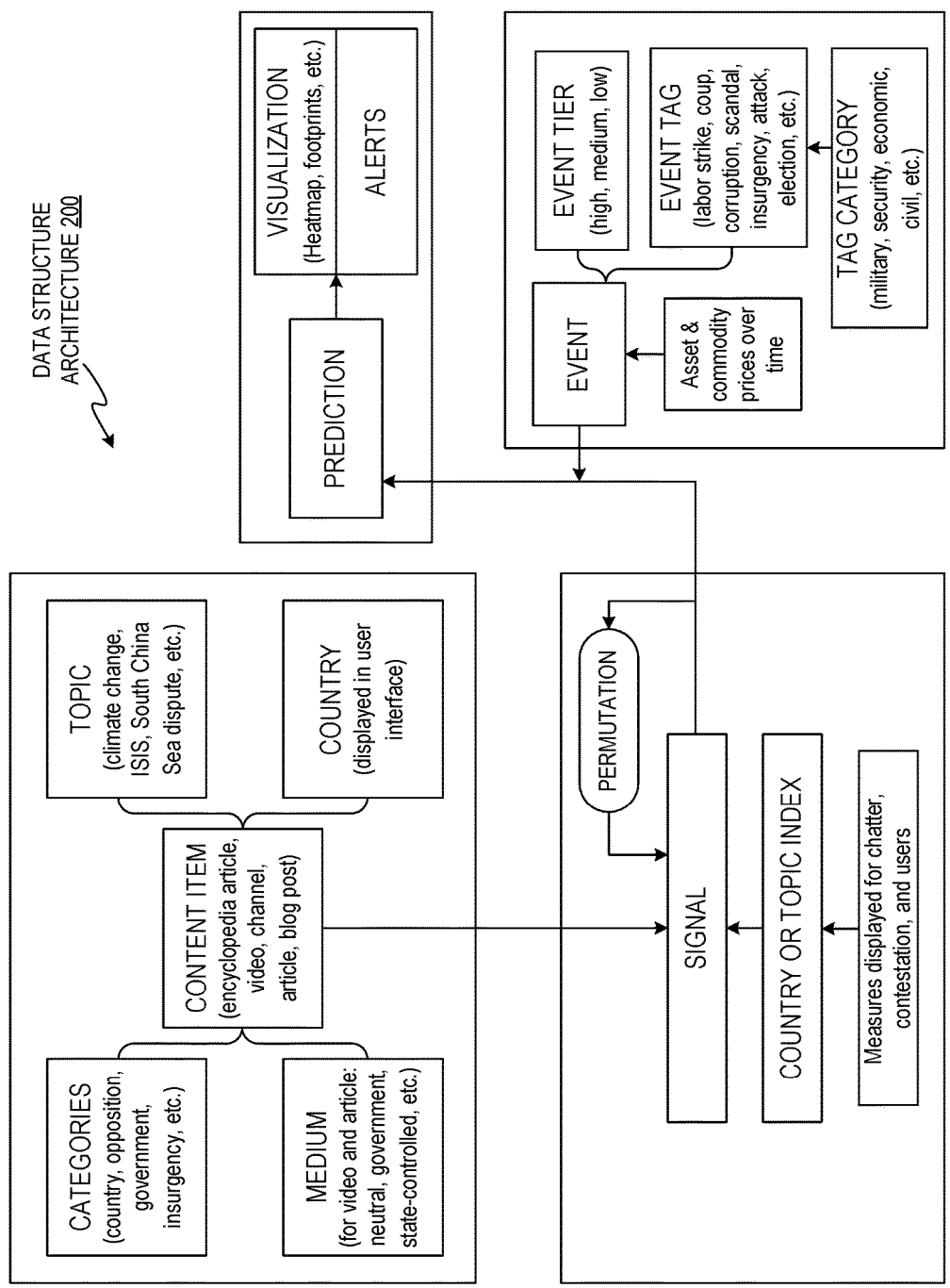
FIG. 2 illustrates data structure architecture for extracting geopolitical event prediction signals metadata of a content item in accordance with an embodiment of the disclosure.

FIG. 2 illustrates data structure architecture 200 for extracting geopolitical event prediction signals metadata of a content item in accordance with an embodiment of the disclosure. A content item, such as an encyclopedia article, a video, a video channel, an online newspaper article, or a blog post, may be associated with or mapped to various categories (e.g., countries, oppositions, governments, insurgencies, etc.), topics (e.g., climate change, ISIS, the South China Sea dispute, etc.), mediums specific to content type (e.g., neutral, government-controlled, state-controlled, etc. for videos and newspaper articles), and/or countries. The metadata of the content item may be retrieved, and a signal may be generated by extracting one or more parameters from the content item. The content item may be identified, for example, by filtering a set of content items based on a country index, topic index, etc. supplied by one or more users or an intelligence database.

Various permutations of signals may be performed to generate a composite signal that may be used to serve as a predictor of a geopolitical event. A prediction may be generated, for example, in response to the signal meeting a threshold condition, and an appropriate alert may be generated. Prediction visualization may be provided by a client device utilizing the system, as is illustrated below in FIGS. 3A-3I. A database of historical events may also be maintained and updated periodically. The event data may be utilized to optimize signal parameters, as described below with respect to FIG. 7.

FIGS. 3A-3I illustrate exemplary user interfaces 300A-300I for data visualization and navigation of geopolitical subject matter in accordance with embodiments of the disclosure. For example, in some embodiments the user interfaces 300A-300I may be implemented as any of the user interfaces 122A-122Z or the visualization module 160.

Figure 3A:
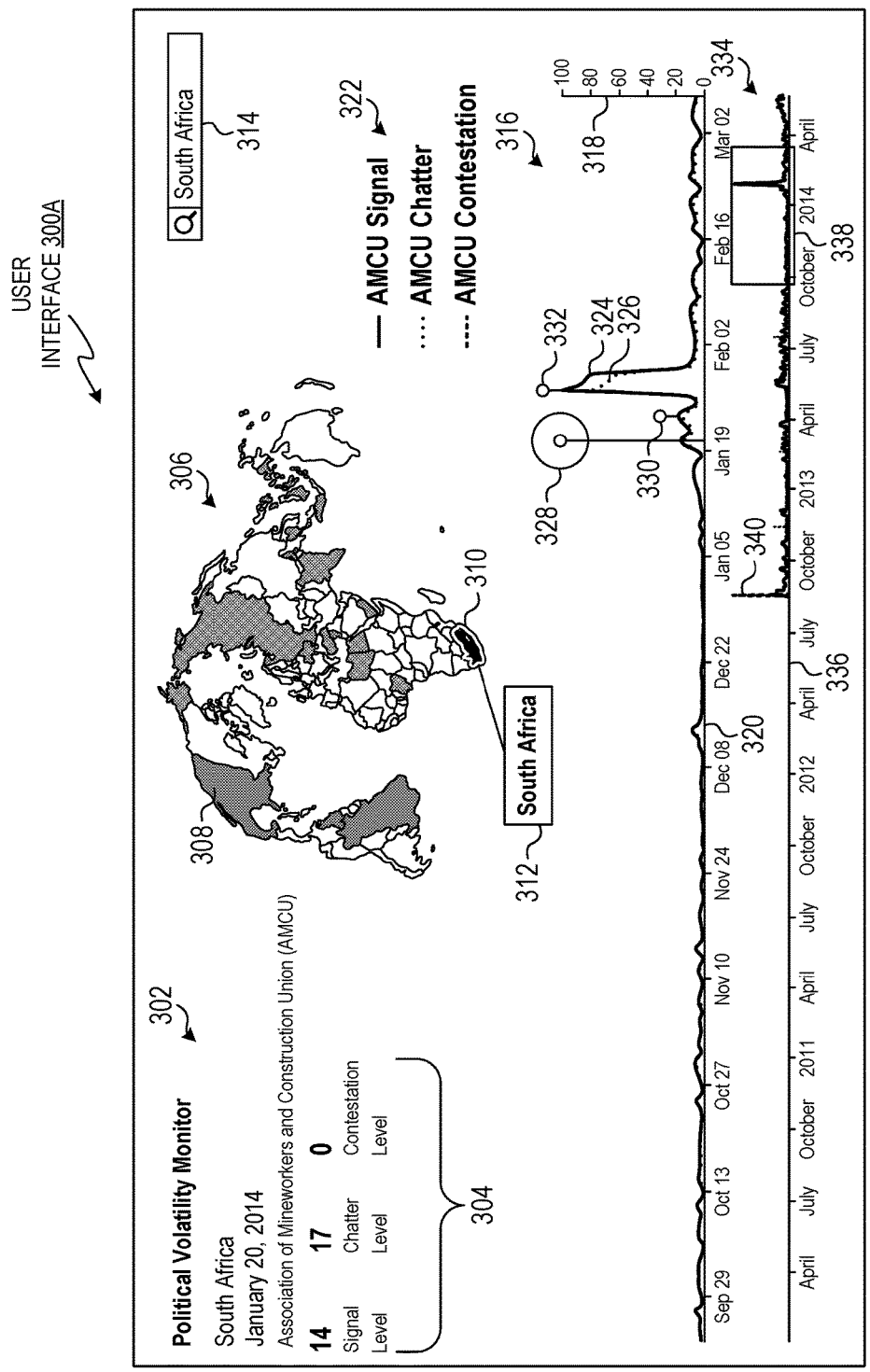
FIG. 3A illustrates an exemplary user interface in accordance with an embodiment of the disclosure.

As a first example, FIG. 3A illustrates a user interface 300A used for tracking political volatility in South Africa prior to, during, and after a major mining strike. The user interface 300A includes a summary region 302, which indicates a geopolitical region and a particular entity, person, or set of keywords being monitored (e.g., in this case, the "Association of Mineworkers and Construction Union (AMCU)"). A signal summary 304 is also displayed, which may correspond to signal values an overall signal level (e.g., a composite signal), a chatter level (e.g., an activity signal), and contestation level (e.g., a contestation signal) for a particular date (e.g., Jan. 20, 2014, as indicated in the summary region 302).

Figure 3B:
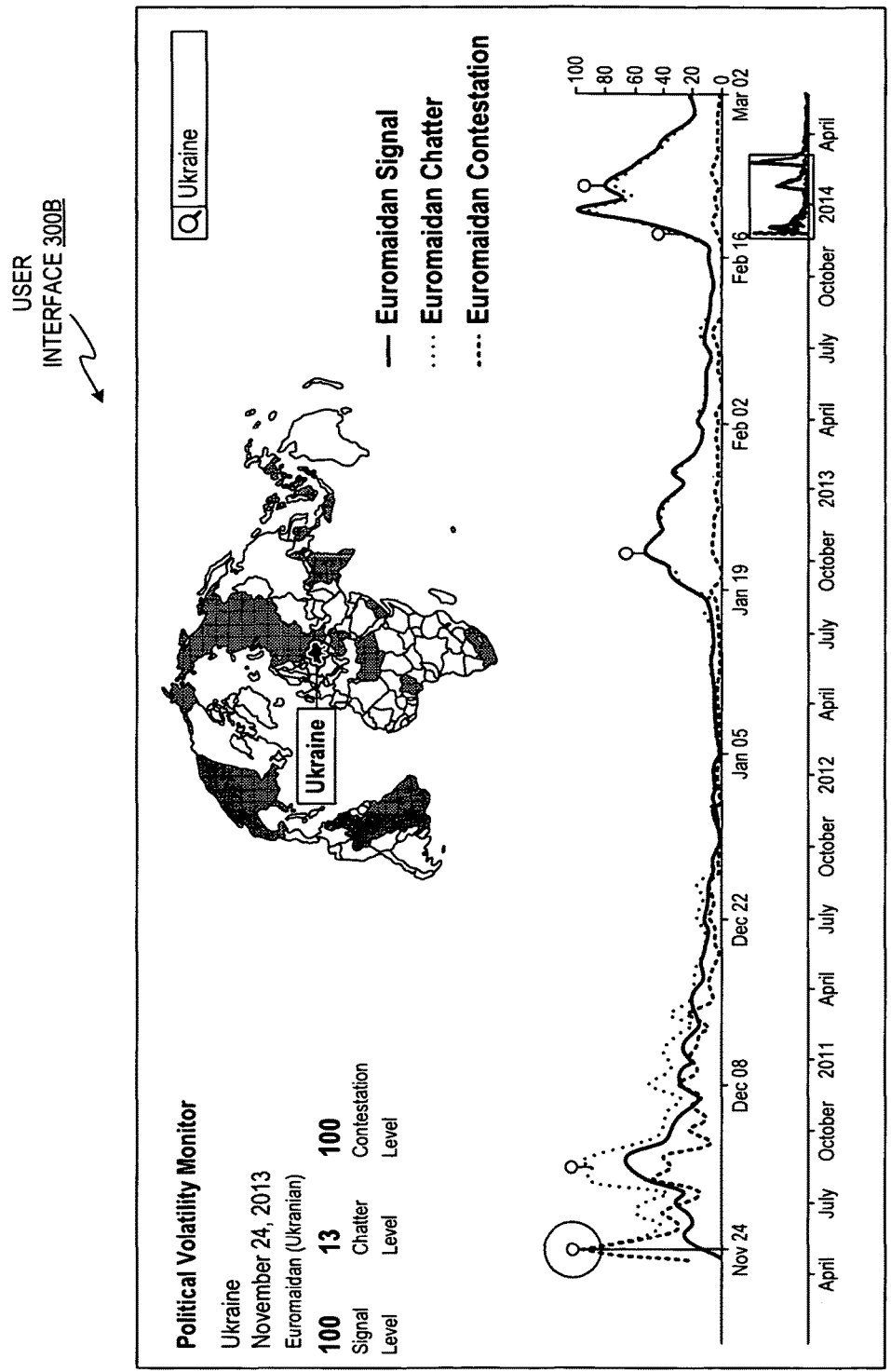
FIG. 3B illustrates another exemplary user interface in accordance with an embodiment of the disclosure.

The user interface 300A includes an interactive map 306, which provides a graphical representation of each country of the world and their respective borders. In some embodiments, the interactive map 306 may be expanded or reduced in size. In some embodiments, the interactive map 306 may be displayed in another suitable format, such as a rotatable globe. In some embodiments, countries that are currently being monitored may be visually distinguishable from other countries. For example, country representation 308 (e.g., the United States) is shaded to indicate that a particular entity is currently being monitored. Indicator 310 may indicate a particular country that is the subject of the user interface 300A. For example, indicator 310 is highlighting South Africa since an entity associated with South Africa is the current subject of the user interface 300A. For example, the indicator 310 may have appeared in response to a user selection of South Africa on the interactive map 306, and data associated with one or more entities of South Africa may be displayed. A user selection of Ukraine, for example, may cause the indicator 310 to highlight Ukraine and display data associated with Ukraine, as illustrated in FIG. 3B. In some embodiments, a search string may be entered into search box 314, which may result in the identification or a matching country or entity. For example, a search for "South Africa" may cause South Africa to be selected in the interactive map 306, as well as monitored data associated with South Africa to be displayed in the user interface 300A.

The user interface 300A also displays a plot region 334 and a sub-plot region 316. The plot region 334 includes a time axis 336, which may span days, months or years, and may be adjustable. In some embodiments, the plot region 334 may display all available monitored signal data, and may be updated in real time as signal data is extracted from newly collected metadata. Box 338 indicates a user-selectable data range that is to be displayed in the sub-plot region 316. For example, a user may shrink, expand, and translate the box 338 to adjust the range of signal data visible in the sub-plot region 316, with the sub-plot region 316 updating in real time as the box 338 is adjusted.

The sub-plot region 316 includes a time axis 320, which may be set by the horizontal bounds of the box 338 with respect to the time axis 336, and a signal axis 318. In some embodiments, the signal axis is normalized to a maximum value within of any of the signals in the sub-plot region 316. In some embodiments, different signals may be displayed in each of the plot region 334 and the sub-plot region 316, and may be recognizable by a signal key 322. For example, the overall signal 324 ("AMCU Signal") and activity signal 326 ("AMCU Chatter") are displayed in the sub-plot region 316, while the contestation signal 340 ("AMCU Contestation") and the overall signal 324 are displayed in the plot region 334. In some embodiments, the user may adjust which signals are displayed in which plot. Marker 328 may be an adjustable marker that a user can use to select a particular date. For example, the position of the marker 328 corresponds to Jan. 20, 2014 and may cause the values in the signal summary 304 to reflect signal levels for this time point.

Event indicators 330 and 332 are also displayed in the user interface 300A. Event indicators may be inputted manually by the user, may be imported from an event database, or received in another suitable fashion. For example, the event indicator 330 corresponds to a major mining strike that occurred in South Africa on Jan. 23, 2014. As observed in the user interface 300A, signal levels appeared to peak just days prior to this event, which may have served as a predictive indicator to the user of an occurrence of a major event.

FIG. 3B illustrates a user interface 300B used for tracking political volatility in Ukraine by monitoring activity and contestation signals related to the Euromaidan protests. The signals appear to spike prior to a major protest rally in Kiev, as well as prior to significant violence, including the first deaths of the protest.

Figure 3C:
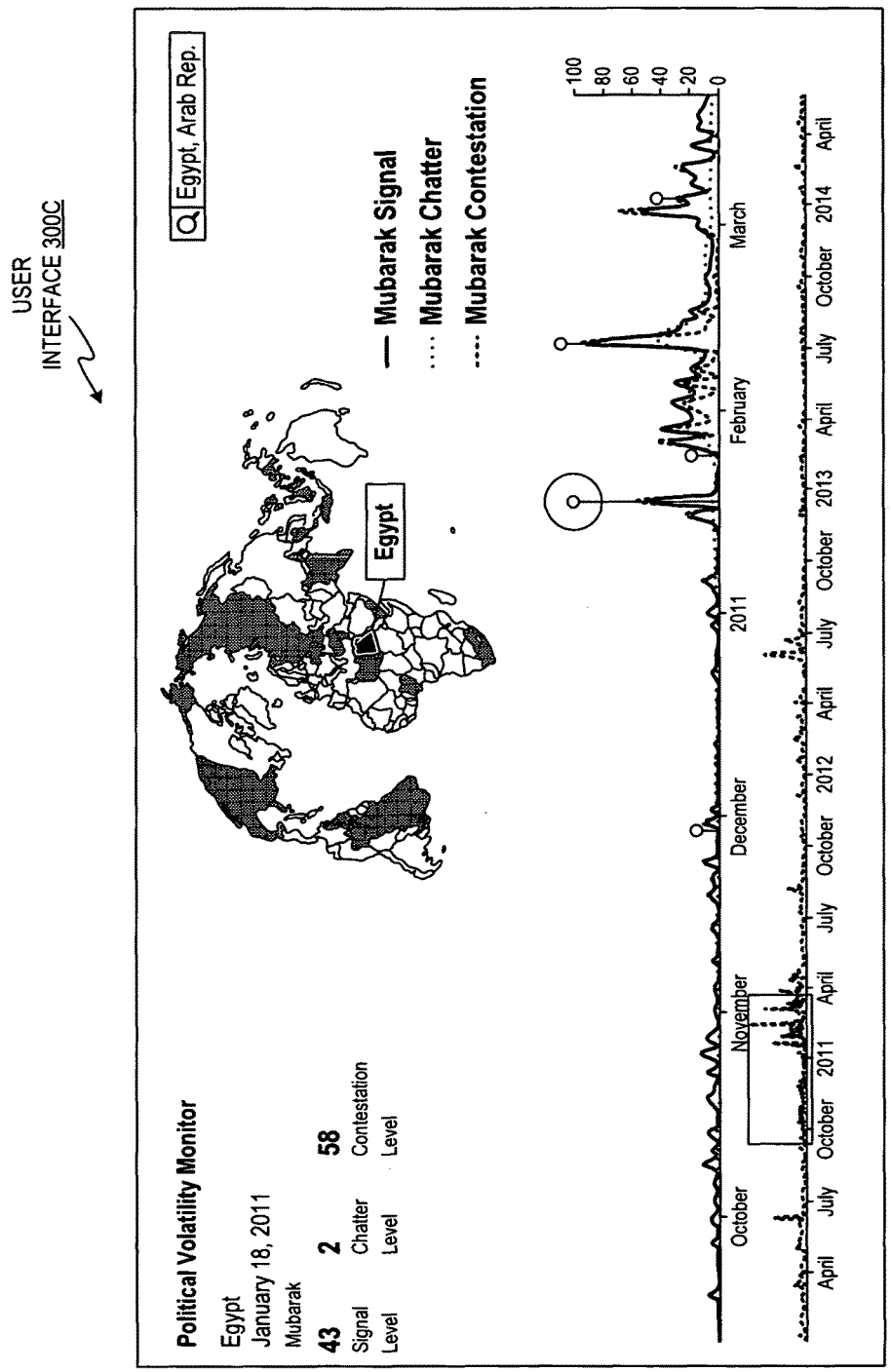
FIG. 3C illustrates another exemplary user interface in accordance with an embodiment of the disclosure.

FIG. 3C illustrates a user interface 300C used for tracking political volatility in Egypt by monitoring activity and contestation signals related to Hosni Mubarak. The signals appear to spike prior to Mubarak's resignation on Feb. 11, 2011.

Figure 3D:
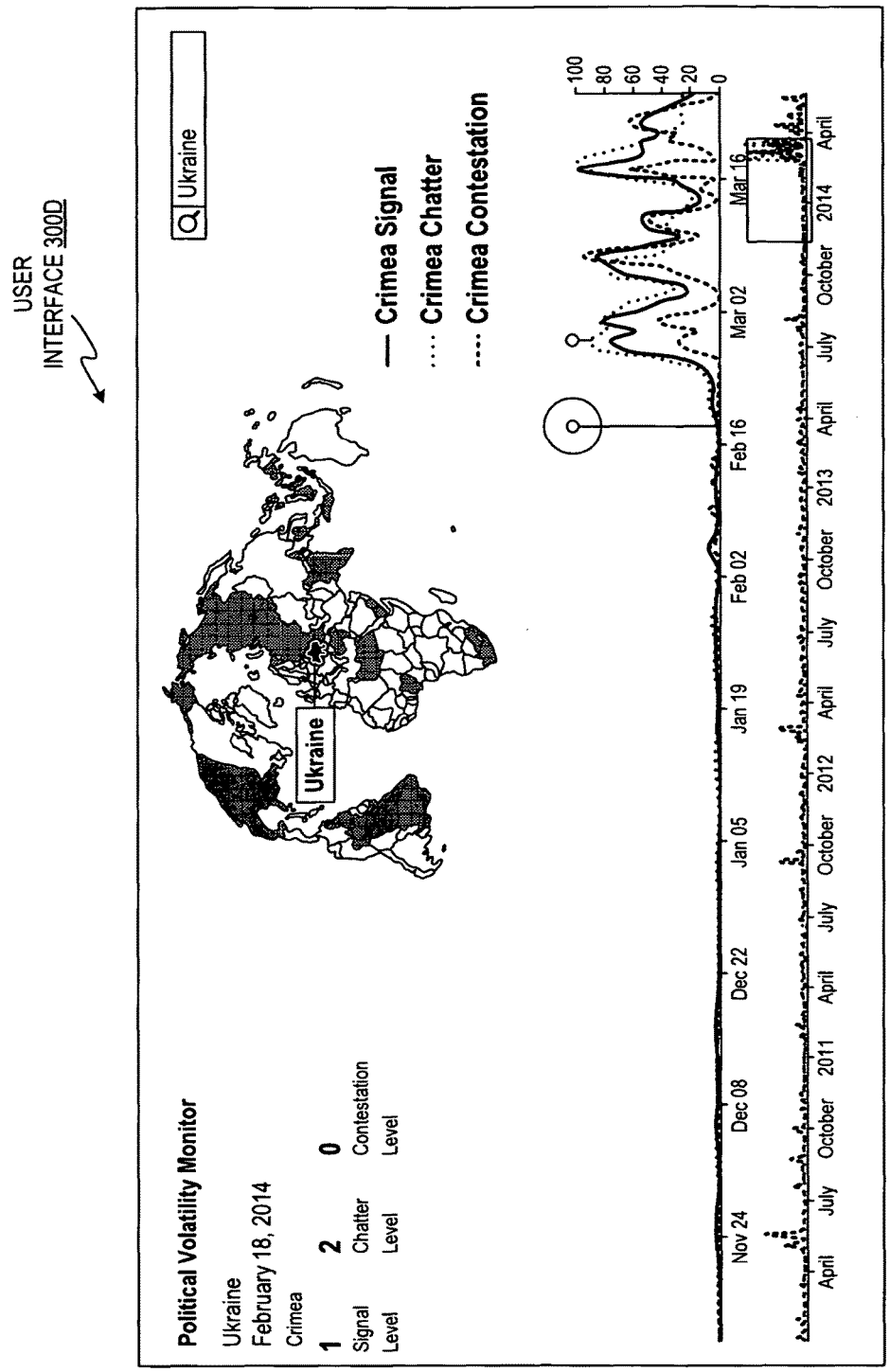
FIG. 3D illustrates another exemplary user interface in accordance with an embodiment of the disclosure.

FIG. 3D illustrates a user interface 300D used for tracking political volatility in Ukraine by monitoring activity and contestation signals related to a specific region (Crimea). The signals appear to spike prior pro-Russian gunmen seizing Crimea, which was later annexed by Russia.

Figure 3E:
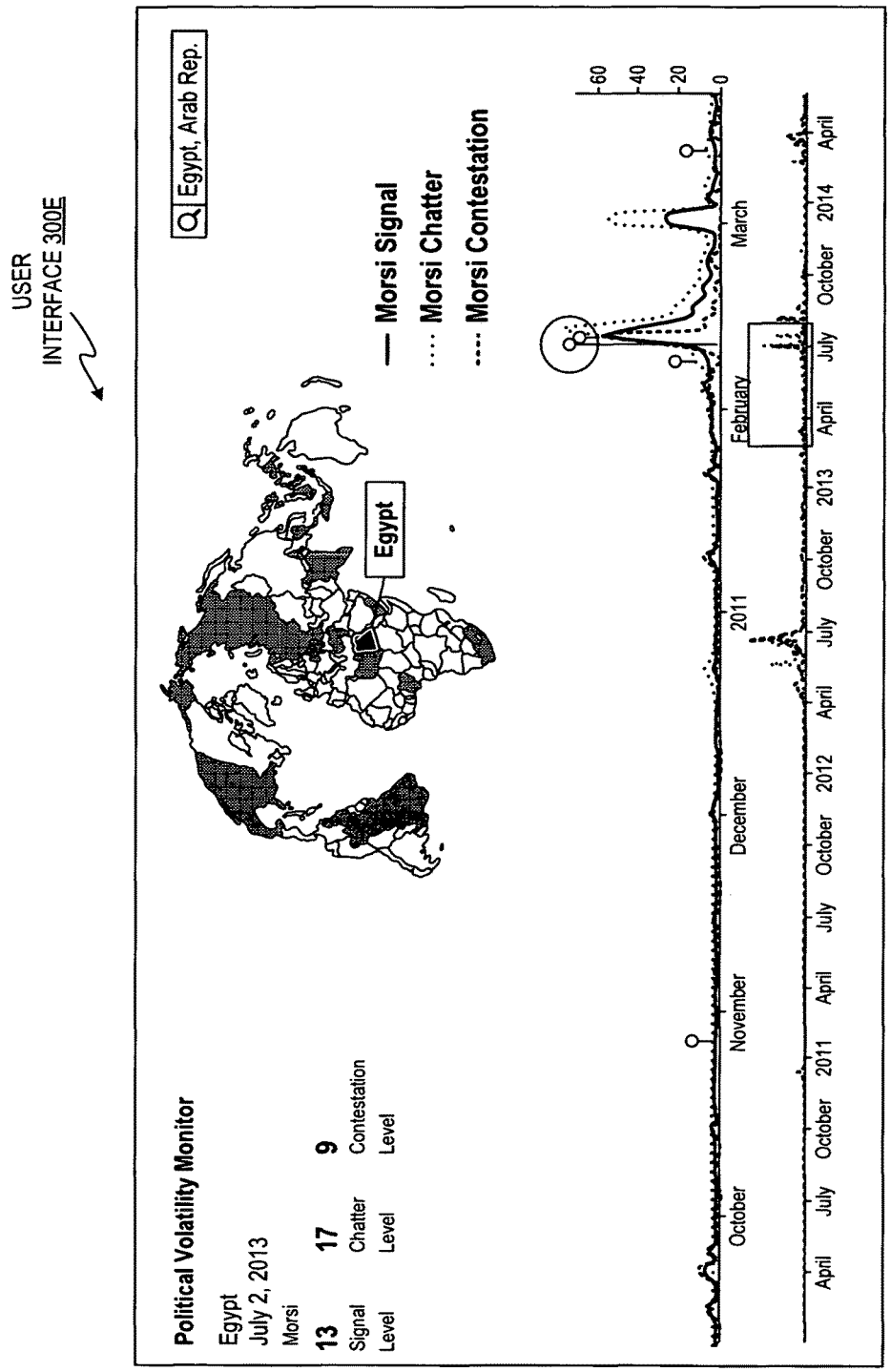
FIG. 3E illustrates yet another exemplary user interface in accordance with an embodiment of the disclosure.

FIG. 3E illustrates a user interface 300E used for tracking political volatility in Egypt by monitoring activity and contestation signals related to Mohamed Morsi. The signals appear begin spiking just prior to the coup that unseated Morsi on Jul. 3, 2013.

Figure 3F:
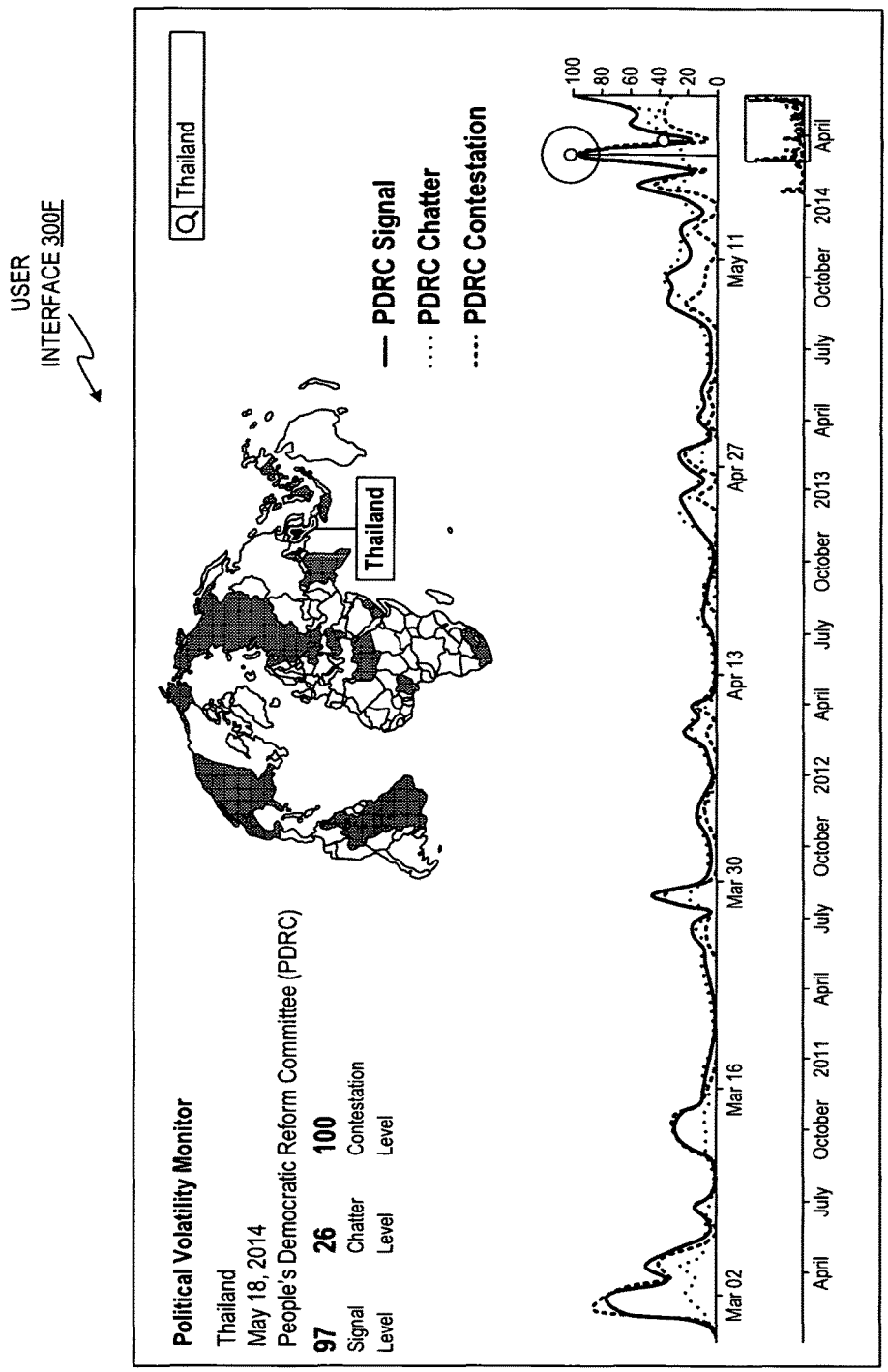
FIG. 3F illustrates another exemplary user interface in accordance with an embodiment of the disclosure.

FIG. 3F illustrates a user interface 300F used for tracking political volatility in Thailand by monitoring activity and contestation signals related to the People's Democratic Reform Committee (PDRC). The signals appear to spike prior to the coup in Thailand on May 22, 2014.

Figure 3G:
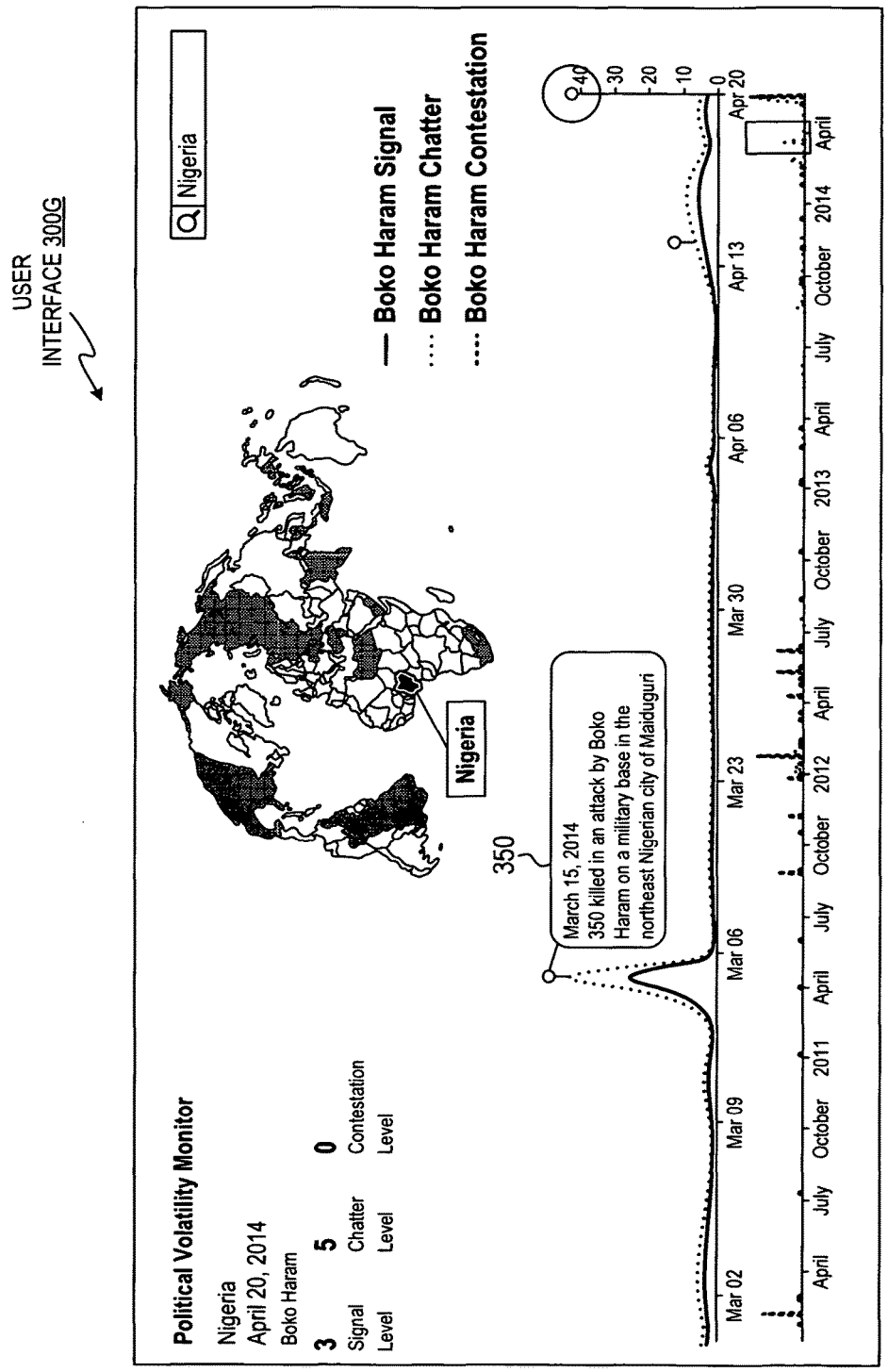
FIG. 3G illustrates another exemplary user interface in accordance with an embodiment of the disclosure.

FIG. 3G illustrates a user interface 300G used for tracking political volatility in Nigeria by monitoring activity and contestation signals related to Boko Haram. The signals begin to spike prior to an attack by Boko Haram that killed hundreds of people. In some embodiments, an event summary may be displayed.

Figure 3H:
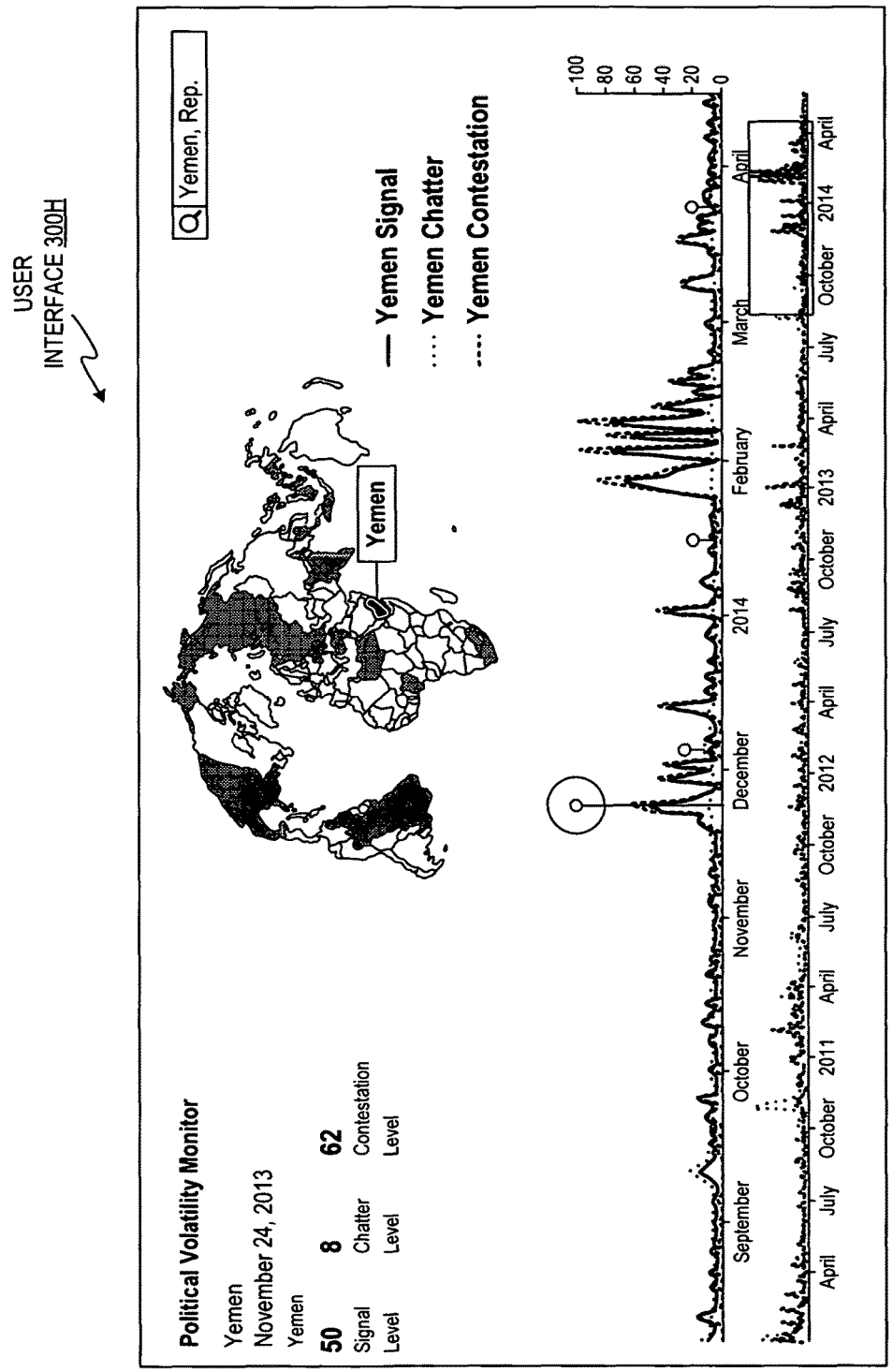
FIG. 3H illustrates another exemplary user interface in accordance with an embodiment of the disclosure.

FIG. 3H illustrates a user interface 300H used for tracking political volatility in Yemen by monitoring activity and contestation signals related to overall signals associated with Yemen (e.g., which may be composited with other signals). The signals appear to spike prior to major al-Qaeda attacks in Yemen.

Figure 3I:
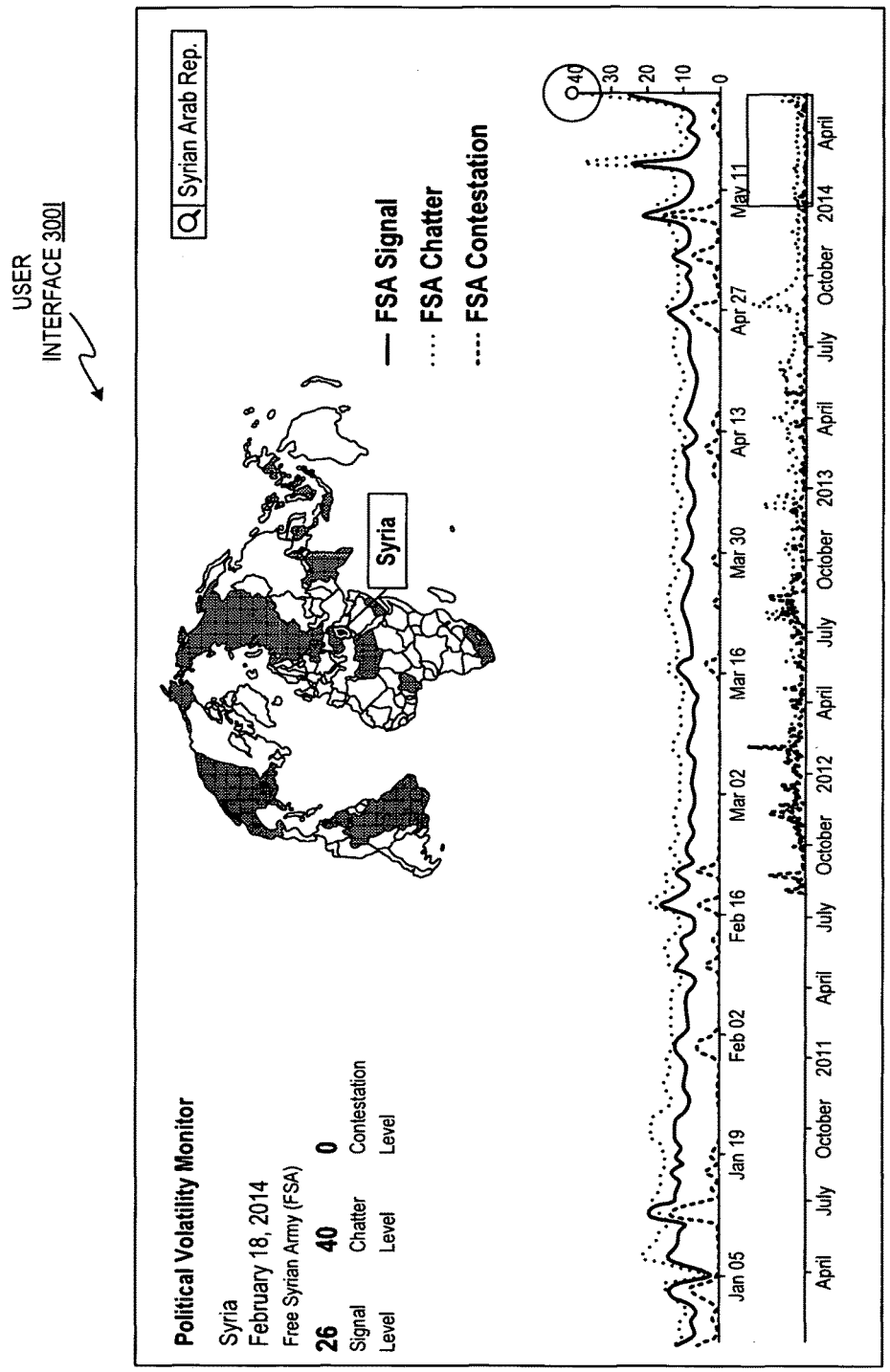
FIG. 3I illustrates another exemplary user interface in accordance with an embodiment of the disclosure.

FIG. 3I illustrates a user interface 300I used for tracking political volatility in Syria by monitoring activity and contestation signals related to the Free Syrian Army.

Figure 4:
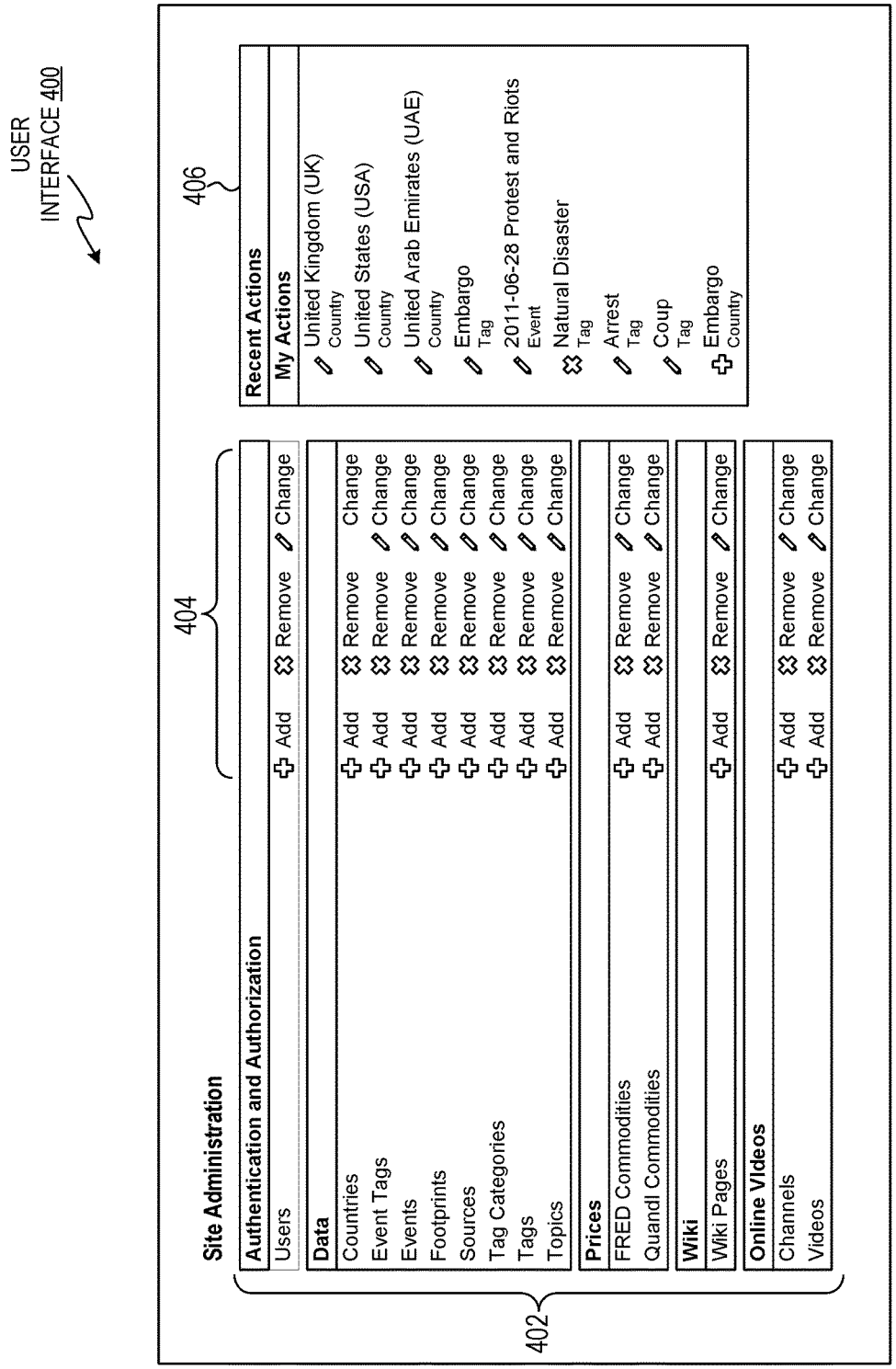
FIG. 4 illustrates a user interface for providing site administration functionality to a user in accordance with an embodiment of the disclosure.
Figure 5B:
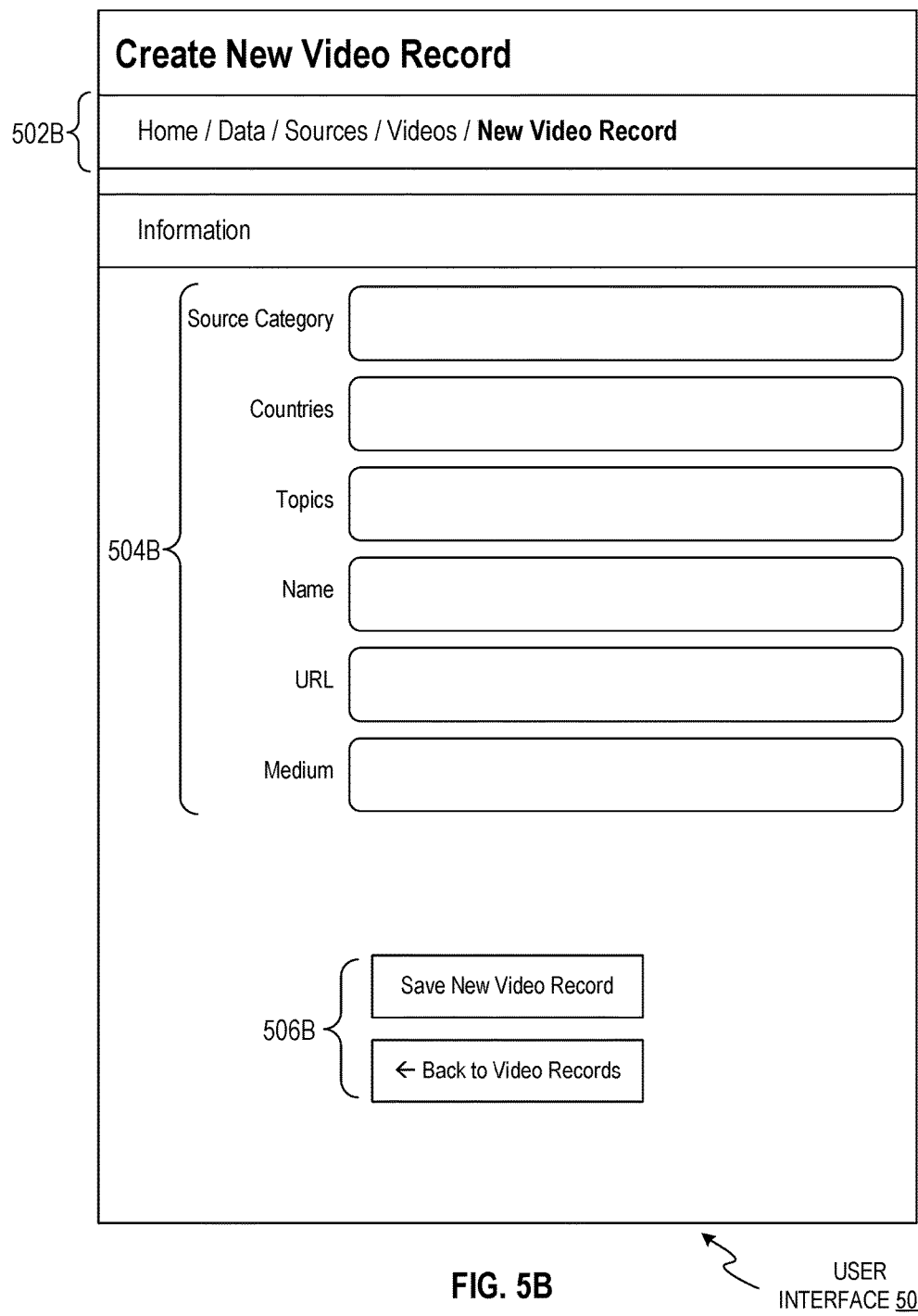
FIG. 5B illustrates a user interface for generating a record to track an online video in accordance with an embodiment of the disclosure.
Figure 5C:
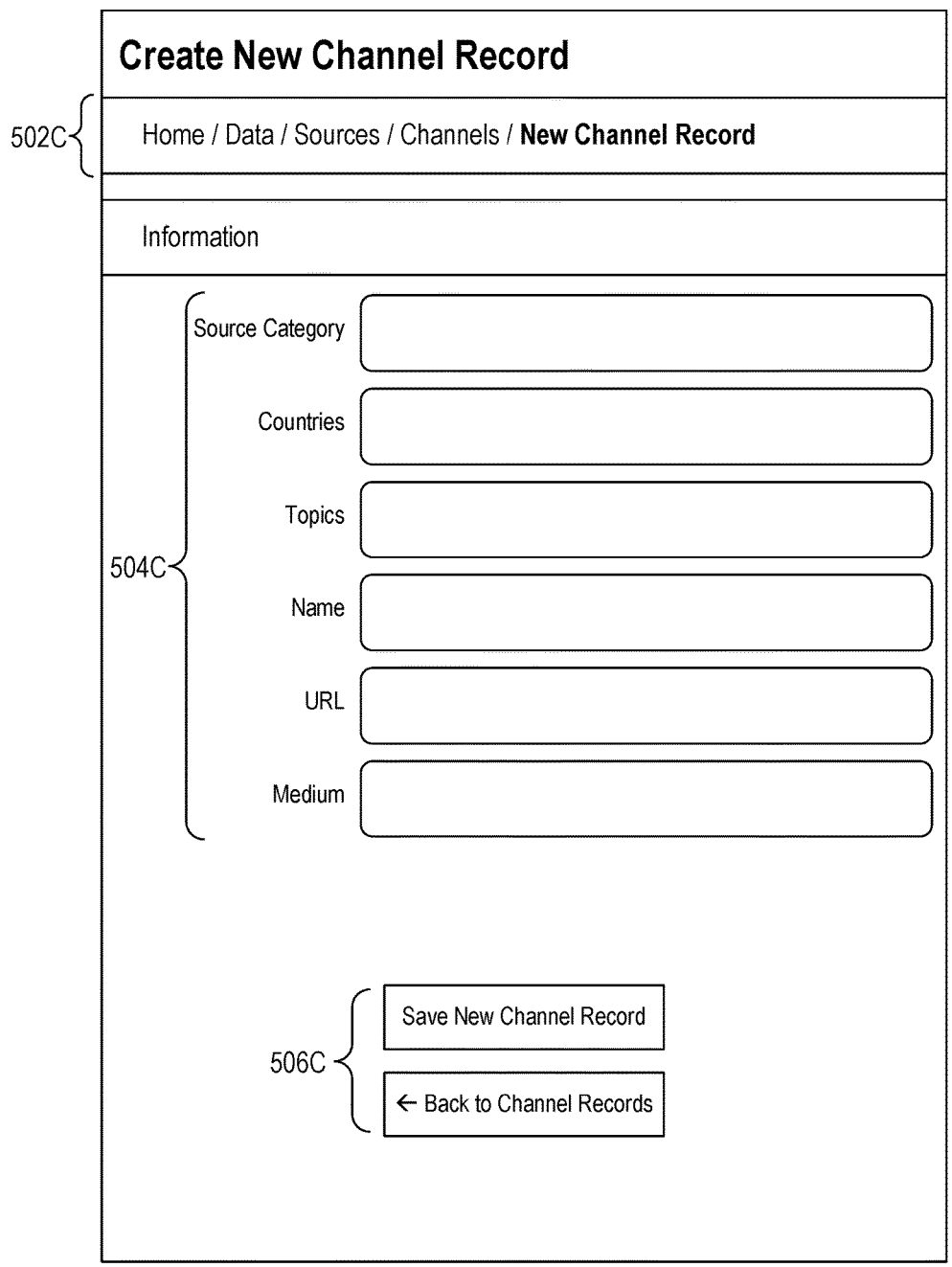
FIG. 5C illustrates a user interface for generating a record to track an online video channel in accordance with an embodiment of the disclosure.
Figure 5D:
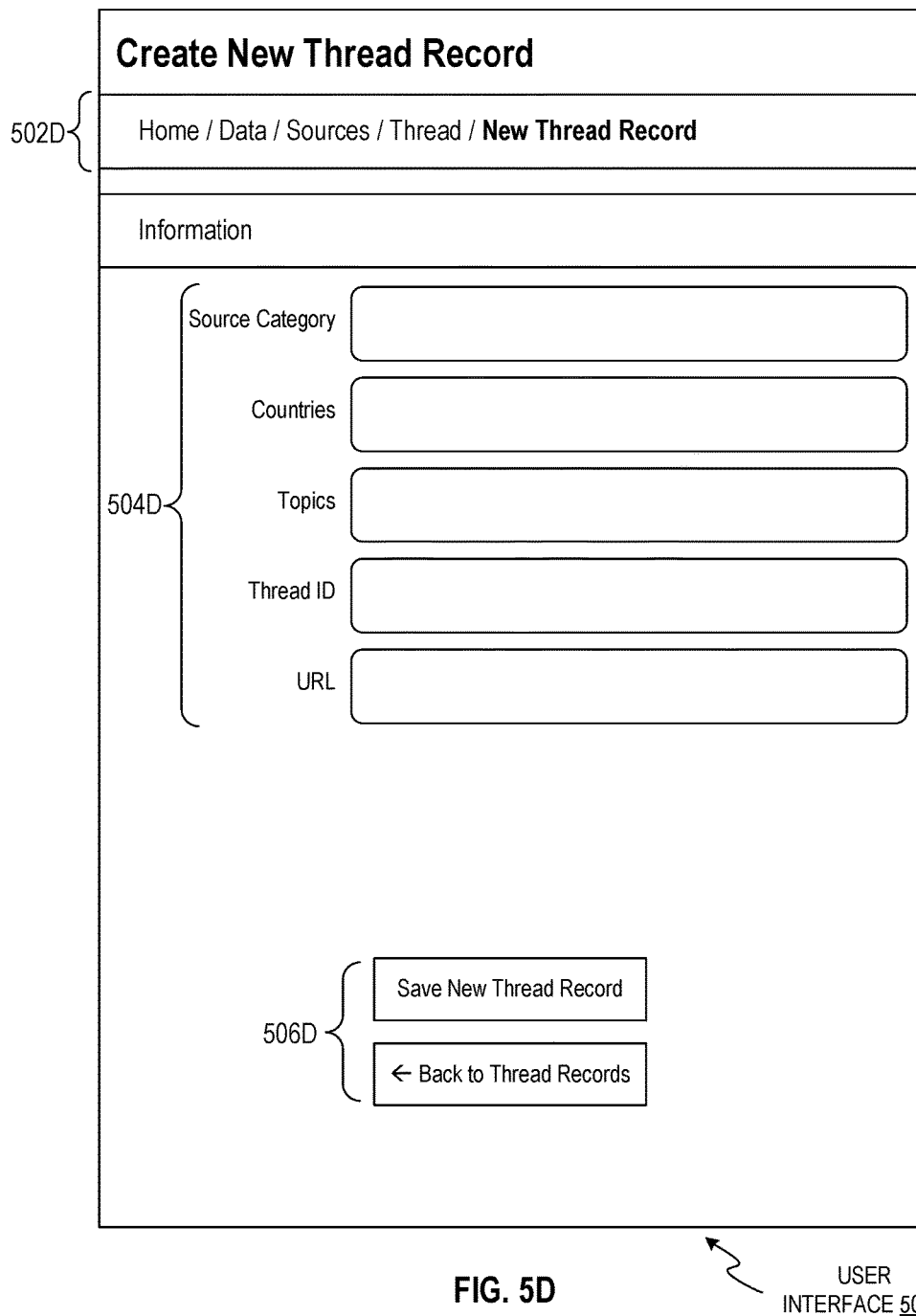
FIG. 5D illustrates a user interface for generating a record to track an online forum thread in accordance with an embodiment of the disclosure.
Figure 5E:
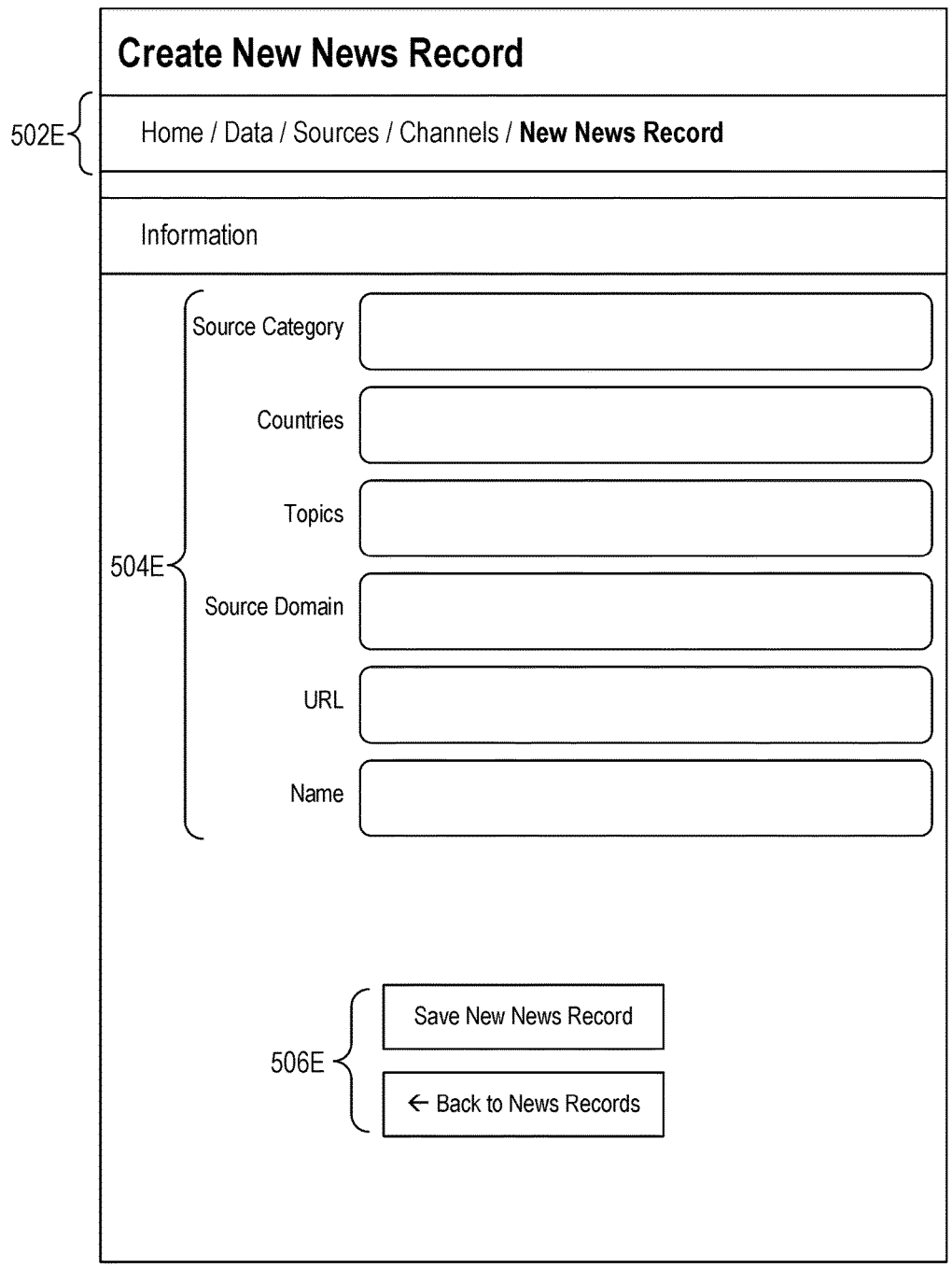
FIG. 5E illustrates a user interface for generating a record to track an online newspaper article in accordance with an embodiment of the disclosure.

FIG. 4 illustrates a user interface 400 for providing site administration functionality to a user in accordance with an embodiment of the disclosure. For example, the user interface 400 may be implemented on a client device (e.g., user interface 122A of the client device 120A) to allow the user to control which content items are to be tracked and analyzed by the data analysis module 150. The user may select from various parameters 402 to edit, add, or import, including which users may access the system, countries to be tracked, event information, content sources, as well as particular content items. The user may select edit options 404 to add, delete, or edit parameters. In some embodiments, the user interface 400 may display a recent actions window 406 to list the most recent additions, deletions, or edits performed. In some embodiments, if multiple users are utilizing the system from different client devices, the recent actions window 406 may display all recent actions taken by authorized users, and may indicate which users performed which actions.

FIGS. 5A-5F illustrate user interfaces 500A-500E for generating records related to different types of content items in accordance with embodiments of the disclosure. Each of the user interfaces 500A-500E illustrate record generation user interfaces for, respectively, an online encyclopedia, an online video, an online video channel, an online forum thread, and an online newspaper article. In some embodiments, one or more of the user interfaces 500A-500E may be accessible via the user interface 400. Each of the user interfaces 500A-500E displays a record location bar 502A-502E, respectively, which may allow the user to navigate through the records. Each of the user interfaces 500A-500E include fields 504A-504E, respectively, that allow the user to flag particular content items to be tracked (e.g., by supplying a URL), and associate the content items with various geopolitical regions, individuals or entities, categories, topics, mediums, and languages. Options 506A-506E are also available to allow the user to updated records, save records, delete records, or return to a list of records. Once such records are created, the data analysis module 150 may then dynamically and programmatically download metadata associated with the content items at a regularly scheduled time, at the request of the user, or when the data analysis module 150 detects that changes to the tracked content items have occurred.

Figure 6:
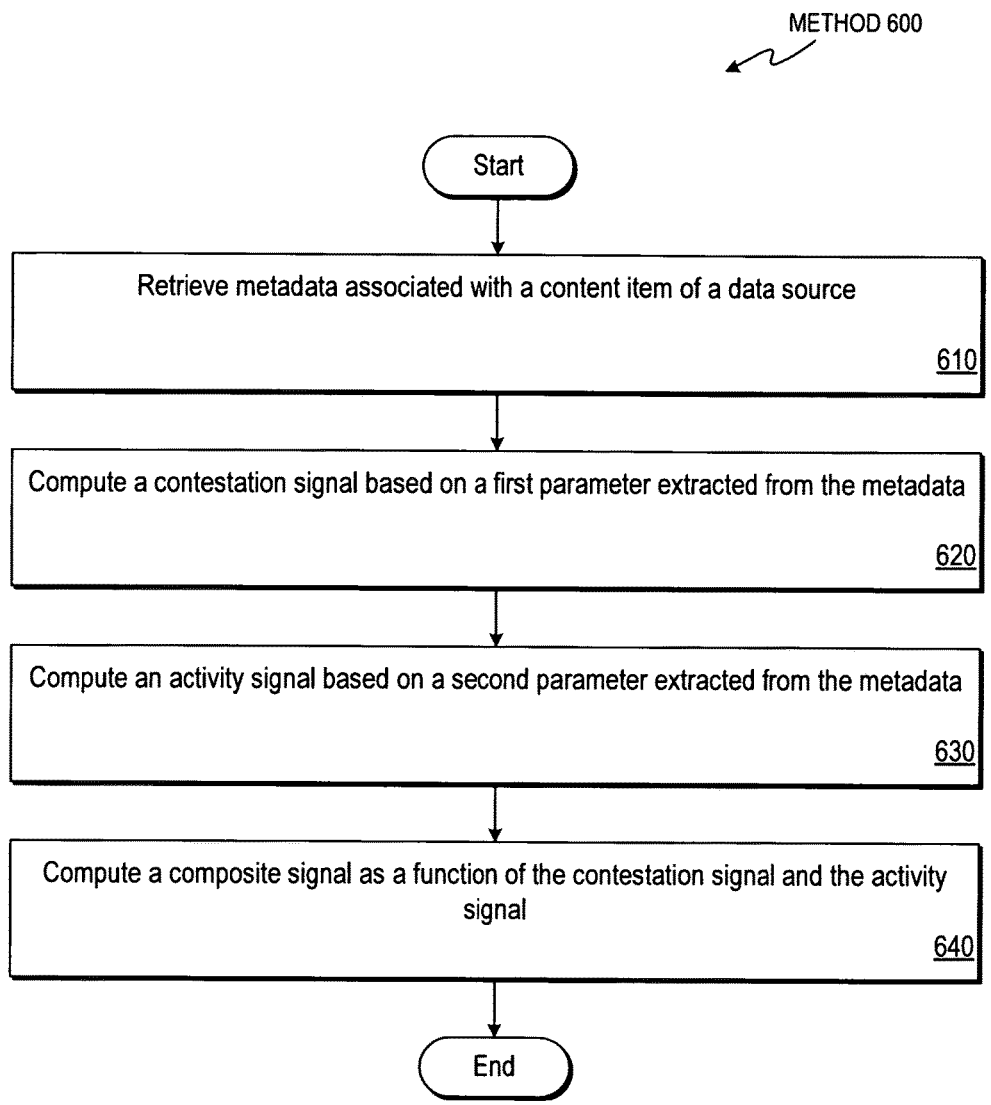
FIG. 6 is a flow diagram illustrating a method for generating signals to predict geopolitical events in accordance with an embodiment of the disclosure.
Figure 7:
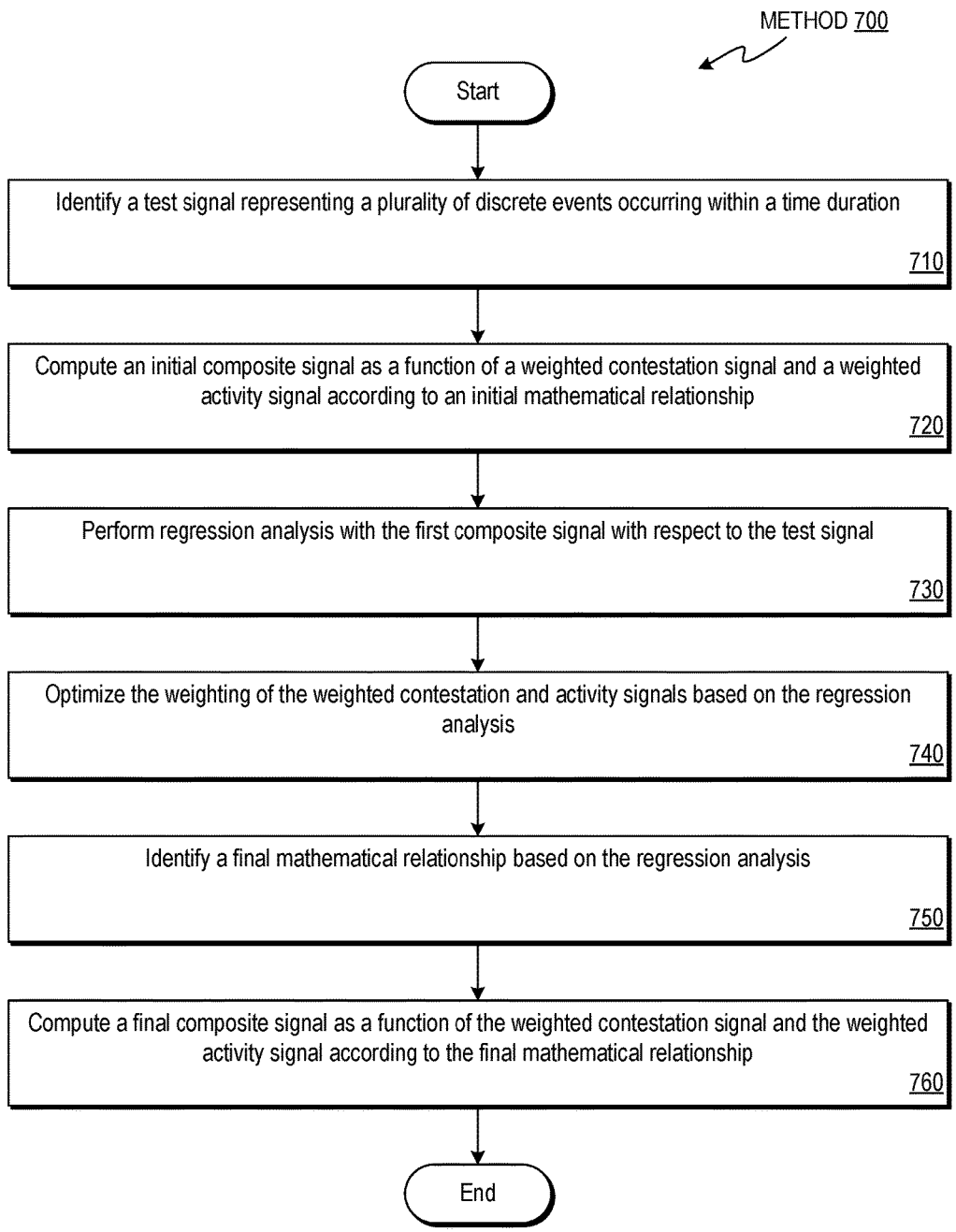
FIG. 7 is a flow diagram illustrating a method for optimizing a composite signal in accordance with an embodiment of the disclosure.

FIG. 6 is a flow diagram illustrating a method 600 for generating signals to predict geopolitical events in accordance with an embodiment of the disclosure. FIG. 7 is a flow diagram illustrating a method 700 for optimizing a composite signal in accordance with an embodiment of the disclosure. The methods 600 and 700 may be performed by processing logic that includes hardware (e.g., circuitry, dedicated logic, programmable logic, microcode, etc.), software (e.g., instructions run on a processing device to perform hardware simulation), or a combination thereof. In one embodiment, the methods 600 and 700 may each be performed by a processing device executing the data analysis module 150 described with respect to FIGS. 1A and 1B. In one embodiment, the methods 600 or 700 are executed by a processing device of a server (e.g., the analysis server 140). In another embodiment, the methods 600 or 700 are executed by a processing device of a client device (e.g., one of the client devices 120A-120Z).

Referring to FIG. 6, the method 600 begins at block 610 when a processing device retrieves, from a first data source, metadata associated with a first content item of the first data source (e.g., one of the content servers 130A-130Z, the data store 110, etc.). In one embodiment, the first data source is a publicly available data source. In one embodiment, metadata is aggregated from a plurality of data sources that includes the first data source. The aggregated metadata may be associated with a plurality of content items that includes the first content item.

In one embodiment, the first content item is specified by the user (e.g., as depicted in any of FIGS. 5A-5F). In one embodiment, the first content item is automatically identified by the processing device, for example, based on a keyword specified by the user. For example, if the keyword is "Egypt", the processing device may search the data sources (e.g., the content servers 130A-130Z) to identify content items related to geopolitical events and entities associated with Egypt (e.g., a Wikipedia article for Mohamed Morsi).

At block 620, the processing device computes a contestation signal based on a first parameter extracted from the metadata. The contestation signal may be a time-dependent signal that is indicative of a dispute among consumers of the first content item over a particular time duration, and the first parameter may be a numeric value representative of an "intensity" of the dispute.

The first parameter may be a numeric value within the metadata (e.g., a number of page views, a number of comments, dates/times when a comment is posted, etc.) or may be computed based on one or more numeric values within the metadata (e.g., a moving average of values within the metadata, a number of comments posted over a time duration, a ratio of unique content consumers to a total number of posts by all consumers, etc.). In one embodiment, the processing device extracts the first parameter from the metadata based on a type of the first content item. For example, the type of the first content item may be selected from a video, an online forum thread, an editable article, an online newspaper article, a blog post, and a social media page. In one embodiment, if the type of the first content item is an online video, the first parameter extracted from the metadata may be a ratio of public comments versus unique consumers of the online video computed over a time duration. In one embodiment, if the type of the first content item is an online encyclopedia entry, the first parameter extracted from the metadata may be a number of edits of the first content item over a time duration.

At block 630, the processing device computes an activity signal based on a second parameter extracted from the metadata. The activity signal may be a time-dependent signal that is indicative of a volume of activity of the consumers of the first content item over a particular time duration, and the second parameter may be a numeric value representative of the volume.

The second parameter may be a numeric value within the metadata (e.g., a number of page views, a number of comments, dates/times when a comment is posted, etc.) or may be computed based on one or more numeric values within the metadata (e.g., a moving average of values within the metadata, a number of comments posted over a time duration, a number of consumers accessing the first content item over a time duration, etc.). In one embodiment, the processing device extracts the second parameter from the metadata based on a type of the first content item. In other embodiments, the second parameter may be extracted from the first content item independent of the type.

In some embodiments, sampling rates of the contestation signal and the activity signal may determine a time duration used for extracting the first and second parameters, respectively. For example, if sampling rate is one sample per day for the contestation signal and the first content item is an online encyclopedia entry, the number of edits of the first content item may be counted within a one-day period at which the metadata is sampled.

In one embodiment, the processing device retrieves updated metadata associated with the first content item, and updates the contestation signal and the activity signal based on the updated metadata. For example, a contestation signal, $S_C(t)$, may correspond to metadata retrieved over the course of days 1 to N. At day N+1, updated metadata may be retrieved, which may replace or append the original metadata, and $S_C(N+1)$ may be computed based on the updated metadata. In some embodiments, updated metadata may be retrieved periodically based on the sampling rate of one or more of the contestation signal or the activity signal.

At block 640, the processing device computes a composite signal as a function of the contestation signal and the activity signal. In one embodiment, the processing device multiplies the contestation signal by a first weight to compute a weighted contestation signal, multiplies the activity signal by a second weight to compute a weighted activity signal, and computes the first composite signal by combining the weighted contestation signal and the weighted activity signal according to a mathematical relationship.

In one embodiment, the processing device retrieves, from a second data source, metadata associated with a second content item of the second data source. The processing device then computes a second composite signal based on parameters extracted from the metadata associated with the second content item (e.g., similar to how the first composite signal is computed), and computes a third composite signal as a function of the first composite signal and the second composite signal. For example, the third composite signal may be a weighted function of the first composite signal and the second composite signal. Weighting between the first and second composite signals may be determined, for example, based on a normalization factor between the two signals.

In one embodiment, the processing device transmits the contestation signal, the activity signal, and the first composite signal to a client device (e.g., one of the client devices 120A-120Z), wherein the client device is to generate for display representations of the contestation signal, the activity signal, and the first composite signal (e.g., as illustrated in FIGS. 3A-3I). In one embodiment, the processing device detects that the first composite signal satisfies a threshold condition, and generates an alert indicative of a potential geopolitical event. For example, the threshold condition may be a condition that is triggered when the first composite signal exceeds a pre-defined value.

Referring to FIG. 7, the method 700 begins at block 710 when a processing device identifies a test signal representing a plurality of discrete events occurring within a time duration. The test signal may be represented as a series of pulses, with pulses representing the discrete events (e.g., actual geopolitical events). In some embodiments, the test signal may correspond to a contestation signal, an activity signal, or a composite signal of the two. In some embodiments, the test signal may be a composite of one or more signals and a series of pulses representing the discrete events.

At block 720, the processing device computes an initial composite signal as a function of a weighted contestation signal and a weighted activity signal according to an initial mathematical relationship. The initial mathematical relationship may be a test function selected from a plurality of functions/mathematical relationships. The weighted contestation signal may be a contestation signal (e.g., computed as described with respect to the method 600) that is multiplied by an initial contestation weight, and the weighted activity signal may be an activity signal (e.g., computed as described with respect to the method 600) that is multiplied by an initial contestation weight.

At block 730, the processing device performs regression analysis with the initial composite signal with respect to the test signal. In some embodiments, the regression analysis may be iterative in order to identify contestation and activity weights and a mathematical relationship that optimizes the fit of the composite signal to the test signal. In some embodiments, learning algorithms may be utilized to further optimize the fit. At block 740, the weighting of the weighted contestation and activity signals is optimized based on the regression analysis, and final contestation and activity weights are be computed. At block 750, the processing device identifies a final mathematical relationship based on the regression analysis, which may be selected from a plurality of pre-defined mathematical relationships. At block 760, a final composite signal is computed as a function of the weighted contestation and activity signals (based on the final weights) according to the final mathematical relationship.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Although embodiments of the disclosure were discussed in terms of predicting geopolitical events, the embodiments may also be generally applied to any system in which event prediction is applicable, such as financial market modeling. Thus, embodiments of the disclosure are not limited to geopolitical events.

Figure 8:
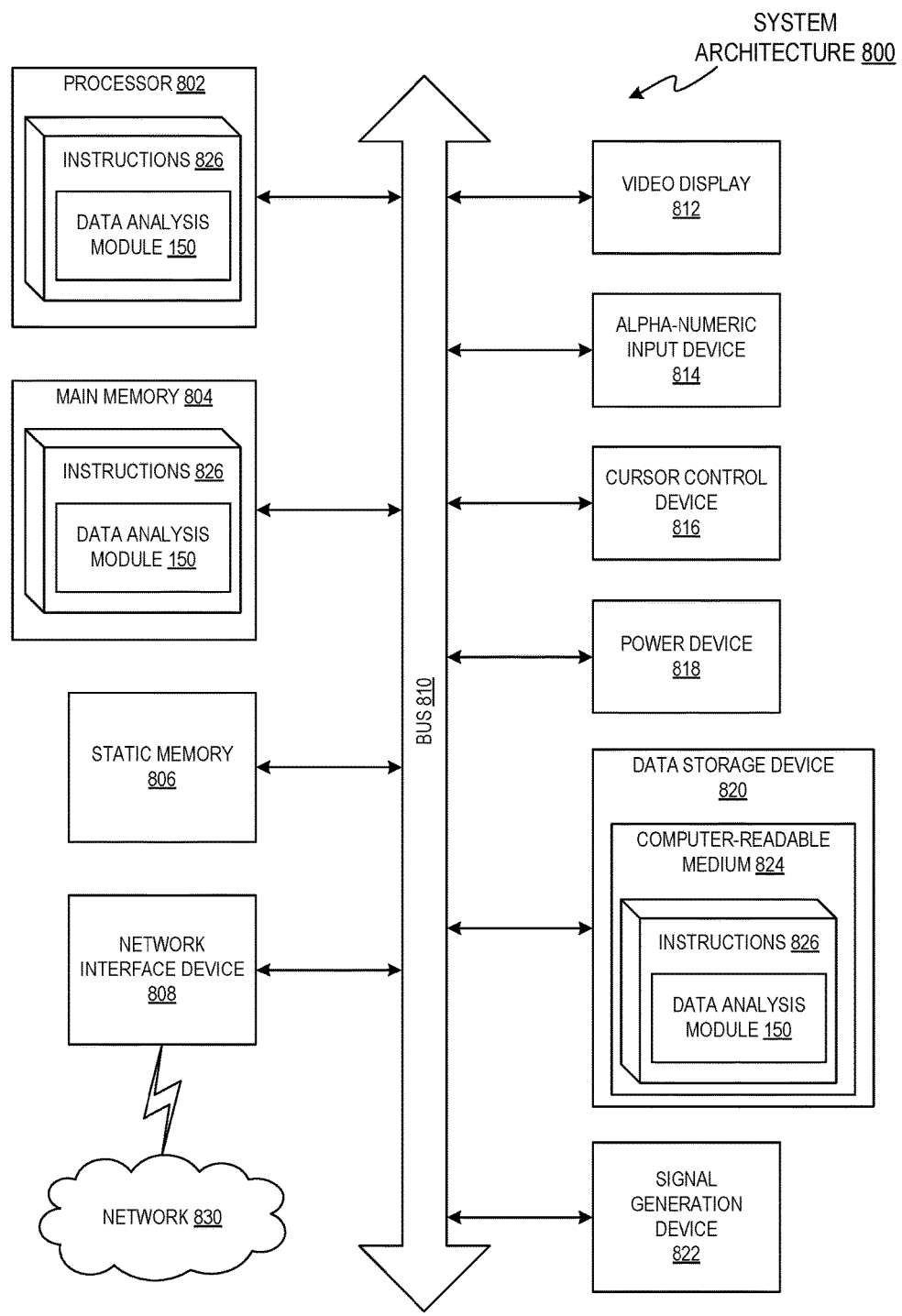
FIG. 8 is a block diagram illustrating an exemplary computer system in accordance with an embodiment of the disclosure.

FIG. 8 illustrates a diagrammatic representation of a machine in the exemplary form of a computer system 800 within which a set of instructions (e.g., for causing the machine to perform any one or more of the methodologies discussed herein) may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 800 may be utilized by or illustrative of any of the data store 110, one or more of the client devices 120A-120Z, one or more of the content servers 130A-130Z, and the analysis server 140.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 820, which communicate with each other via a bus 810.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 808. The computer system 800 also may include a video display unit 812 (e.g., a liquid crystal display (LCD), a cathode ray tube (CRT), or a touch screen), an alphanumeric input device 814 (e.g., a keyboard), a cursor control device 816 (e.g., a mouse), and a signal generation device 822 (e.g., a speaker).

Power device 818 may monitor a power level of a battery used to power the computer system 800 or one or more of its components. The power device 818 may provide one or more interfaces to provide an indication of a power level, a time window remaining prior to shutdown of computer system 800 or one or more of its components, a power consumption rate, an indicator of whether computer system is utilizing an external power source or battery power, and other power related information. In some embodiments, indications related to the power device 818 may be accessible remotely (e.g., accessible to a remote back-up management module via a network connection). In some embodiments, a battery utilized by the power device 818 may be an uninterruptable power supply (UPS) local to or remote from computer system 800. In such embodiments, the power device 818 may provide information about a power level of the UPS.

The data storage device 820 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 830 (e.g., the network 105) via the network interface device 808.

In one embodiment, the instructions 826 include instructions for one or more data analysis modules 150, which may correspond to the identically-named counterpart described with respect to FIGS. 1A and 1B. While the computer-readable storage medium 824 is shown in an exemplary embodiment to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving", "retrieving", "transmitting", "computing", "generating", "adding", "subtracting", "multiplying", "dividing", "optimizing", "calibrating", "detecting", "performing", "analyzing", "determining", "enabling", "identifying", "modifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMS), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an embodiment" or "one embodiment" means that a particular feature, structure, or characteristic described in connection with the embodiment is included in at least one embodiment. Thus, the appearances of the phrase "an embodiment" or "one embodiment" in various places throughout this specification are not necessarily all referring to the same embodiment. Moreover, it is noted that the "A-Z" notation used in reference to certain elements of the drawings is not intended to be limiting to a particular number of elements. Thus, "A-Z" is to be construed as having one or more of the element present in a particular embodiment.

The present disclosure is not to be limited in scope by the specific embodiments described herein. Indeed, other various embodiments of and modifications to the present disclosure pertaining to the prediction of geopolitical conflict, in addition to those described herein, will be apparent to those of ordinary skill in the art from the preceding description and accompanying drawings. Thus, such other embodiments and modifications pertaining to the prediction of geopolitical conflict are intended to fall within the scope of the present disclosure. Further, although the present disclosure has been described herein in the context of a particular embodiment in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A method of predicting a geopolitical event, the method comprising:
   retrieving, from a first data source, metadata associated with a first content item of the first data source;
   computing a contestation signal based on a first parameter extracted from the metadata;
   computing an activity signal based on a second parameter extracted from the metadata, wherein each of the contestation signal and the activity signal is computed without processing language, content, or sentiment associated with the first content item;
   computing a first composite signal as a function of the contestation signal and the activity signal, wherein each of the contestation signal, the activity signal, and the first composite signal is represented by a sequence of discrete intensity values corresponding to specific time points;
   yielding a prediction of the geopolitical event based at least in part on an intensity of the first composite signal by detecting that the first composite signal satisfies a threshold condition; and
   generating an alert indicative of the prediction of the geopolitical event.

2. The method of claim 1, wherein the contestation signal is indicative of a dispute among consumers of the first content item, and wherein the activity signal is indicative of a volume of activity of the consumers of the first content item.

3. The method of claim 1, further comprising:
transmitting the contestation signal, the activity signal, and the first composite signal to a client device, wherein the client device is to generate for display representations of the contestation signal, the activity signal, and the first composite signal.

4. The method of claim 1, wherein the first parameter is extracted from the metadata based on a type of the first content item.

5. The method of claim 4, wherein the type of the first content item is selected from a group consisting of a video, an online forum thread, an editable article, an online newspaper article, a blog post, and a social media page.

6. The method of claim 4, wherein the type of the first content item is an online video, and wherein the first parameter is a ratio of public comments versus unique consumers of the online video computed over a time duration.

7. The method of claim 4, wherein the type of the first content item is an online encyclopedia entry, and wherein the first parameter is a number of edits of the first content item over a time duration.

8. The method of claim 1, wherein the first data source is a publicly available data source.

9. The method of claim 1, further comprising:
retrieving updated metadata associated with the first content item; and
updating the contestation signal and the activity signal based on the updated metadata.

10. The method of claim 1, wherein the first content item is specified by a user.

11. The method of claim 1, wherein the first content item is automatically identified based on a keyword specified by a user.

12. The method of claim 1, wherein retrieving the metadata further comprises aggregating metadata from a plurality of data sources, the plurality of data sources including the first data source.

13. The method of claim 1, further comprising:
retrieving, from a second data source, metadata associated with a second content item of the second data source;
computing a second composite signal based on parameters extracted from the metadata associated with the second content item; and
computing a third composite signal as a function of the first composite signal and the second composite signal.

14. The method of claim 1, wherein computing the first composite signal comprises:
multiplying the contestation signal by a first weight to compute a weighted contestation signal;
multiplying the activity signal by a second weight to compute a weighted activity signal; and
computing the first composite signal by combining the weighted contestation signal and the weighted activity signal according to a mathematical relationship.

15. The method of claim 14, wherein computing the first composite signal further comprises:
identifying a test signal representing a plurality of discrete events occurring within a time duration; and
computing the first composite signal based on the test signal.

16. The method of claim 15, wherein computing the first composite signal based on the plurality of discrete events further comprises:
optimizing the first weight and the second weight by performing regression analysis with the first composite signal with respect to the test signal.

17. The method of claim 16, wherein the mathematical relationship is selected from a plurality of pre-defined mathematical relationships based on the regression analysis.

18. A non-transitory machine-readable medium having instructions encoded thereon that, when executed by a processing device, cause the processing device to:
retrieve, from a first data source, metadata associated with a first content item of the first data source;
compute a contestation signal based on a first parameter extracted from the metadata;
compute an activity signal based on a second parameter extracted from the metadata, wherein each of the contestation signal and the activity signal is computed without processing language, content, or sentiment associated with the first content item;
compute a first composite signal as a function of the contestation signal and the activity signal, wherein each of the contestation signal, the activity signal, and the first composite signal is represented by a sequence of discrete intensity values corresponding to specific time points;
yield a prediction of a geopolitical event based at least in part on an intensity of the first composite signal; and
transmit the contestation signal, the activity signal, and the first composite signal to a client device, wherein the client device is to generate for display representations of the contestation signal, the activity signal, and the first composite signal.

19. A system comprising:
a memory; and
a processing device communicatively coupled to the memory, wherein the processing device is to:
retrieve, from a first data source, metadata associated with a first content item of the first data source;
compute a contestation signal based on a first parameter extracted from the metadata;
compute an activity signal based on a second parameter extracted from the metadata, wherein each of the contestation signal and the activity signal is computed without processing language, content, or sentiment associated with the first content item;
compute a first composite signal as a function of the contestation signal and the activity signal, wherein each of the contestation signal, the activity signal, and the first composite signal is represented by a sequence of discrete intensity values corresponding to specific time points;
yield a prediction of a geopolitical event based at least in part on an intensity of the first composite signal; and
transmit the contestation signal, the activity signal, and the first composite signal to a client device, wherein the client device is to generate for display representations of the contestation signal, the activity signal, and the first composite signal.

* * * * *